US012750807B2

(12) United States Patent
Li et al.

(10) Patent No.: US 12,750,807 B2
(45) Date of Patent: Sep. 29, 2026

(54) POSITIONING METHOD AND APPARATUS

(71) Applicant: HUAWEI TECHNOLOGIES CO., LTD., Shenzhen (CN)

(72) Inventors: Cheng Li, Shanghai (CN); Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 424 days.

(21) Appl. No.: 18/477,854

(22) Filed: Sep. 29, 2023

(65) Prior Publication Data

US 2024/0023056 A1 Jan. 18, 2024

Related U.S. Application Data

(63) Continuation of application No. PCT/CN2022/083514, filed on Mar. 28, 2022.

(30) Foreign Application Priority Data

Apr. 2, 2021 (CN) ......................... 202110362505.2

(51) Int. Cl.
*H04W 64/00* (2009.01)
*H04L 5/00* (2006.01)

(52) U.S. Cl.
CPC ........... *H04W 64/00* (2013.01); *H04L 5/0048* (2013.01)

(58) Field of Classification Search
CPC ............................. H04W 64/00; H04L 5/0048
USPC ....................................................... 455/456.1
See application file for complete search history.

(56) References Cited

U.S. PATENT DOCUMENTS

| | | | | |
|---|---|---|---|---|
| 2013/0162470 | A1 | 6/2013 | Rousu et al. | |
| 2017/0006575 | A1* | 1/2017 | Cui | G01S 5/0036 |
| 2020/0383089 | A1* | 12/2020 | Goto | H04L 1/1822 |
| 2021/0185632 | A1* | 6/2021 | Manolakos | H04W 64/003 |
| 2023/0413221 | A1* | 12/2023 | Guo | H04W 24/10 |

FOREIGN PATENT DOCUMENTS

| | | | |
|---|---|---|---|
| CN | 108076478 | A | 5/2018 |
| CN | 108632979 | A | 10/2018 |
| CN | 111758275 | A | 10/2020 |

OTHER PUBLICATIONS

European Search Report for EP Application No. 22778894.0 dated Jul. 15, 2024, 7 pages.

* cited by examiner

*Primary Examiner* — Michael R Neff

(57) ABSTRACT

The technology of this application relates to a positioning method and apparatus, and also relates to the field of communication technologies. In the method, an access network device receives a positioning reference signal from a terminal, determines a positioning measurement result based on the received positioning reference signal, and sends, to a location management function network element, the positioning measurement result and information about an antenna port corresponding to the positioning measurement result or information about a time error corresponding to the positioning measurement result. The location management function network element may determine a location of the terminal based on the information, to, for example, eliminate impact of time errors corresponding to different antenna ports on a positioning result, and improve positioning precision of the terminal.

20 Claims, 8 Drawing Sheets

POSITIONING METHOD AND APPARATUS

CROSS-REFERENCE TO RELATED APPLICATIONS

This application is a continuation of International Application No. PCT/CN2022/083514, filed on Mar. 28, 2022, which claims priority to Chinese Patent Application No. 202110362505.2, filed on Apr. 2, 2021. The disclosures of the aforementioned applications are hereby incorporated by reference in their entireties.

TECHNICAL FIELD

This application relates to the field of communication technologies, and in particular, to a positioning method and apparatus.

BACKGROUND

A high-precision positioning capability is one of development directions of a future cellular positioning network. Currently, in some positioning technologies, transmission time of a signal between a terminal and different base stations needs to be obtained, and a location of the terminal needs to be determined based on the transmission time. Positioning precision of these positioning technologies depends on accuracy of the obtained transmission time.

On a high-frequency millimeter-wave frequency band, because a space loss of a transmission channel is serious, the terminal and the base station usually receive and send signals through a plurality of antenna panels that face different directions, and a plurality of antenna units are installed on each antenna panel, to enhance signal strength through beamforming, so as to resist channel fading. There is a specific processing delay when a signal is received or sent on a radio frequency link connected to the antenna panel. The processing delay may be calibrated, so that the base station is synchronized with the terminal. However, the processing delay is related to a plurality of factors (a hardware parameter, quality, a temperature, noise, and the like). As a result, the processing delay cannot be accurately estimated, and therefore cannot be accurately calibrated. After the calibration, a residual time error exists. Different antenna panels are connected to different radio frequency links, and are independently installed and calibrated. Therefore, the different antenna panels (or the different radio frequency links) usually have different time errors. As a result, a measurement result in a positioning process has a specific time error, and consequently positioning precision is reduced.

SUMMARY

This application provides a positioning method and apparatus, to resolve a problem that positioning precision is reduced because different antenna panels (or different radio frequency links/radio frequency channels) have different time errors.

According to a first aspect, a positioning method is provided, including: An access network device receives a positioning reference signal from a terminal, and sends positioning measurement information to a location management function network element. The positioning measurement information includes a positioning measurement result determined based on the positioning reference signal and information about an antenna port corresponding to the positioning measurement result, and the antenna port is an antenna port of the positioning reference signal on which the positioning measurement result is based. Alternatively, the positioning measurement information includes a positioning measurement result determined based on the positioning reference signal and information about a time error corresponding to the positioning measurement result, and the time error is a time error corresponding to an antenna port of the positioning reference signal on which the positioning measurement result is based. According to the method provided in the first aspect, when reporting the positioning measurement result to the location management function network element, the access network device can report the information about the antenna port corresponding to the positioning measurement result or the information about the time error corresponding to the positioning measurement result. The location management function network element can determine the location of the terminal based on the information. Therefore, impact of time errors corresponding to different antenna ports on the positioning result is eliminated, and positioning precision of the terminal is improved.

In a possible implementation, the method further includes: The access network device receives first indication information from the location management function network element. In this case, that the access network device sends positioning measurement information to a location management function network element may include: The access network device sends the positioning measurement information to the location management function network element based on the first indication information. The first indication information indicates to report the information about the antenna port corresponding to the positioning measurement result, or the first indication information indicates to report the information about the time error corresponding to the positioning measurement result. In this possible implementation, the access network device can determine, based on the indication of the location management function network element, information included in the reported positioning measurement information.

In a possible implementation, when the access network device is a serving access network device of the terminal, the method further includes: The access network device receives a first correspondence from the terminal. The first correspondence includes a correspondence between information about a plurality of antenna ports and information about a plurality of time errors, and each of the plurality of antenna ports is configured to send a corresponding positioning reference signal. In this possible implementation, the access network device can receive the correspondence between the information about the plurality of antenna ports and the information about the plurality of time errors of the terminal, to determine, after obtaining the positioning measurement result, the information about the time error corresponding to the positioning measurement result.

In a possible implementation, the method further includes: The access network device sends second indication information to the terminal, where the second indication information indicates the terminal to report the correspondence between the information about the antenna port and the information about the time error. In this possible implementation, the terminal can determine, based on the indication of the location management function network element, information that needs to be reported.

In a possible implementation, when the positioning measurement information includes the positioning measurement result determined based on the positioning reference signal and the information about the time error corresponding to the positioning measurement result, the method further includes: The access network device determines the positioning measurement result based on the positioning reference signal; and determines, based on the information about the antenna port corresponding to the positioning measurement result and the first correspondence, the information about the time error corresponding to the positioning measurement result. In this possible implementation, the access network device can determine, based on the correspondence between the information about the plurality of antenna ports and the information about the plurality of time errors of the terminal, the information about the time error corresponding to the positioning measurement result after obtaining the positioning measurement result.

In a possible implementation, the method further includes: The access network device sends the first correspondence to the location management function network element. In this possible implementation, the access network device can send the first correspondence to the location management function network element, so that the location management function network element determines the location of the terminal.

In a possible implementation, the method further includes: The access network device receives third indication information from the location management function network element. The third indication information indicates the access network device to report the correspondence between the information about the antenna port and the information about the time error of the terminal. That the access network device sends the first correspondence to the location management function network element includes: The access network device sends the first correspondence to the location management function network element based on the third indication information. In this possible implementation, the access network device can determine, based on the indication of the location management function network element, to report the first correspondence.

In a possible implementation, the information about the time error includes one or more of an index of the time error, a value of the time error, or a value range of the time error.

According to a second aspect, a positioning method is provided, including: A location management function network element receives positioning measurement information from a plurality of access network devices, and determines a location of a terminal based on the positioning measurement information of the plurality of access network devices. The positioning measurement information includes a positioning measurement result determined based on a positioning reference signal of the terminal and information about an antenna port corresponding to the positioning measurement result, and the antenna port is an antenna port of the positioning reference signal on which the positioning measurement result is based. Alternatively, the positioning measurement information includes a positioning measurement result determined based on a positioning reference signal of the terminal and information about a time error corresponding to the positioning measurement result, and the time error is a time error corresponding to an antenna port of the positioning reference signal on which the positioning measurement result is based. According to the method provided in the second aspect, the location management function network element can receive the positioning measurement result, and the information about the antenna port corresponding to the positioning measurement result or the information about the time error corresponding to the positioning measurement result. The location management function network element can determine the location of the terminal based on the information. Therefore, impact of time errors corresponding to different antenna ports on the positioning result is eliminated, and positioning precision of the terminal is improved.

In a possible implementation, the method further includes: The location management function network element sends first indication information to the plurality of access network devices, where the first indication information indicates to report the information about the antenna port corresponding to the positioning measurement result, or the first indication information indicates to report the information about the time error corresponding to the positioning measurement result. In this possible implementation, the access network device is facilitated to determine, based on the indication of the location management function network element, information included in the reported positioning measurement information.

In a possible implementation, that the location management function network element determines a location of a terminal based on positioning measurement information of the plurality of access network devices includes: The location management function network element groups positioning measurement results in the positioning measurement information of the plurality of access network devices based on the information about the antenna port or the information about the time error in the positioning measurement information of the plurality of access network devices; and the location management function network element determines the location of the terminal based on a grouping result. In this possible implementation, the location management function network element can group or calibrate the positioning measurement results based on the information about the antenna port or the information about the time error, and perform positioning resolution by using the positioning measurement result obtained after the grouping or calibration, to determine the location of the terminal. Therefore, impact of time errors corresponding to different antenna ports on the positioning result is eliminated, and positioning precision of the terminal is improved.

In a possible implementation, the method further includes: The location management function network element receives a first correspondence from a serving access network device of the terminal, where the first correspondence includes a correspondence between information about a plurality of antenna ports and information about a plurality of time errors, and each of the plurality of antenna ports is configured to send a corresponding positioning reference signal. In this possible implementation, the location management function network element can calibrate the received positioning measurement result based on the first correspondence, and determine the location of the terminal by using a calibrated positioning measurement result. Therefore, impact of time errors corresponding to different antenna ports on the positioning result is eliminated, and positioning precision of the terminal is improved. Alternatively, when the access network device reports the positioning measurement result and the antenna port corresponding to the positioning measurement result, the location management function network element can determine, based on the first correspondence, the information about the time error corresponding to the positioning measurement result, group the positioning measurement results based on the information about the time error corresponding to the positioning measurement result, and determine the location of the terminal by using the grouping result. Therefore, impact of time errors corresponding to different antenna ports on the positioning result is eliminated, and positioning precision of the terminal is improved.

In a possible implementation, the method further includes: The location management function network element sends third indication information to the serving access network device of the terminal, where the third indication information indicates to report the correspondence between the information about the antenna port and the information about the time error of the terminal.

In a possible implementation, the method further includes: The location management function network element receives the first correspondence from the terminal, where the first correspondence includes the correspondence between the information about the plurality of antenna ports and the information about the plurality of time errors, and each of the plurality of antenna ports is configured to send the corresponding positioning reference signal. In this possible implementation, the location management function network element can calibrate the received positioning measurement result based on the first correspondence, and determine the location of the terminal by using the calibrated positioning measurement result. Therefore, impact of time errors corresponding to different antenna ports on the positioning result is eliminated, and positioning precision of the terminal is improved. Alternatively, when the access network device reports the positioning measurement result and the antenna port corresponding to the positioning measurement result, the location management function network element can determine, based on the first correspondence, the information about the time error corresponding to the positioning measurement result, group the positioning measurement results based on the information about the time error corresponding to the positioning measurement result, and determine the location of the terminal by using the grouping result. Therefore, impact of time errors corresponding to different antenna ports on the positioning result is eliminated, and positioning precision of the terminal is improved.

In a possible implementation, the method further includes: The location management function network element sends fourth indication information to the terminal, where the fourth indication information indicates to report the correspondence between the information about the antenna port and the information about the time error of the terminal.

In a possible implementation, that the location management function network element determines a location of the terminal based on the positioning measurement information of the plurality of access network devices includes: The location management function network element determines the location of the terminal based on the first correspondence and the positioning measurement information of the plurality of access network devices.

In a possible implementation, the information about the time error includes one or more of an index of the time error, a value of the time error, or a value range of the time error.

According to a third aspect, a positioning method is provided, including: A terminal sends a first correspondence to a serving access network device or a location management function network element, where the first correspondence includes a correspondence between information about a plurality of antenna ports and information about a plurality of time errors, each of the plurality of antenna ports is configured to send a corresponding positioning reference signal, and the first correspondence is used to determine a location of the terminal; and the terminal sends a corresponding positioning reference signal through one or more of the plurality of antenna ports. According to the method provided in the third aspect, the terminal sends the first correspondence to the serving access network device, so that the access network device determines the information about the time error corresponding to the positioning measurement result after obtaining the positioning measurement result. The terminal sends the first correspondence to the location management function network element, so that the location management function network element determines the location of the terminal based on the first correspondence (for a specific process, refer to the foregoing descriptions). Therefore, impact of time errors corresponding to different antenna ports on the positioning result is eliminated, and positioning precision of the terminal is improved.

In a possible implementation, the method further includes: The terminal receives configuration information from the serving access network device, where the configuration information includes configuration information of a time-frequency resource of the positioning reference signal and configuration information of an antenna port of the positioning reference signal. That the terminal sends a corresponding positioning reference signal through one or more of the plurality of antenna ports includes: The terminal sends the corresponding positioning reference signal through the one or more of the plurality of antenna ports based on the configuration information.

In a possible implementation, the method further includes: The terminal receives second indication information from the serving access network device or fourth indication information from the location management function network element, where both the second indication information and the fourth indication information indicate the terminal to report the correspondence between the information about the antenna port and the information about the time error. That a terminal sends a first correspondence to a service access network device or a location management function network element includes: The terminal sends the first correspondence to the serving access network device or the location management function network element based on the second indication information or the fourth indication information. In this possible implementation, the terminal can determine, based on the indication of the serving access network device or the location management function network element, information that needs to be reported.

According to a fourth aspect, a positioning apparatus is provided, including a receiving unit, a sending unit, and a processing unit. The receiving unit is configured to receive a positioning reference signal from a terminal. The processing unit is configured to obtain positioning measurement information. The positioning measurement information includes a positioning measurement result determined based on the positioning reference signal and information about an antenna port corresponding to the positioning measurement result, and the antenna port is an antenna port of the positioning reference signal on which the positioning measurement result is based. Alternatively, the positioning measurement information includes a positioning measurement result determined based on the positioning reference signal and information about a time error corresponding to the positioning measurement result, where the time error is a time error corresponding to an antenna port of the positioning reference signal on which the positioning measurement result is based. The sending unit is configured to send the positioning measurement information to a location management function network element.

In a possible implementation, the receiving unit is further configured to receive first indication information from the location management function network element, where the first indication information indicates to report the information about the antenna port corresponding to the positioning measurement result, or the first indication information indicates to report the information about the time error corresponding to the positioning measurement result. The sending unit is specifically configured to send the positioning measurement information to the location management function network element under the indication of the first indication information.

In a possible implementation, the positioning apparatus is a serving positioning apparatus of the terminal. The receiving unit is further configured to receive a first correspondence from the terminal, where the first correspondence includes a correspondence between information about a plurality of antenna ports and information about a plurality of time errors, and each of the plurality of antenna ports is configured to send a corresponding positioning reference signal.

In a possible implementation, the sending unit is further configured to send second indication information to the terminal, where the second indication information indicates the terminal to report the correspondence between the information about the antenna port and the information about the time error.

In a possible implementation, when the positioning measurement information includes the positioning measurement result determined based on the positioning reference signal and the information about the time error corresponding to the positioning measurement result, the processing unit is further configured to determine the positioning measurement result based on the positioning reference signal. The processing unit is further configured to determine, based on the information about the antenna port corresponding to the positioning measurement result and the first correspondence, the information about the time error corresponding to the positioning measurement result.

In a possible implementation, the sending unit is further configured to send the first correspondence to the location management function network element.

In a possible implementation, the receiving unit is further configured to receive third indication information from the location management function network element, where the third indication information indicates the positioning apparatus to report the correspondence between the information about the antenna port and the information about the time error. The sending unit is specifically configured to send the first correspondence to the location management function network element under the indication of the third indication information.

In a possible implementation, the information about the time error includes one or more of an index of the time error, a value of the time error, or a value range of the time error.

According to a fifth aspect, a positioning apparatus is provided, including a receiving unit and a processing unit. The receiving unit is configured to receive positioning measurement information from a plurality of access network devices. The positioning measurement information includes a positioning measurement result determined based on a positioning reference signal of a terminal and information about an antenna port corresponding to the positioning measurement result, and the antenna port is an antenna port of the positioning reference signal on which the positioning measurement result is based. Alternatively, the positioning measurement information includes a positioning measurement result determined based on a positioning reference signal of a terminal and information about a time error corresponding to the positioning measurement result, and the time error is a time error corresponding to an antenna port of the positioning reference signal on which the positioning measurement result is based. The processing unit is configured to determine a location of the terminal based on the positioning measurement information of the plurality of access network devices.

In a possible implementation, the positioning apparatus further includes a sending unit. The sending unit is configured to send first indication information to the plurality of access network devices, where the first indication information indicates to report the information about the antenna port corresponding to the positioning measurement result, or the first indication information indicates to report the information about the time error corresponding to the positioning measurement result.

In a possible implementation, the processing unit is specifically configured to: group positioning measurement results in the positioning measurement information of the plurality of access network devices based on the information about the antenna port or the information about the time error in the positioning measurement information of the plurality of access network devices; and determine the location of the terminal based on a grouping result.

In a possible implementation, the receiving unit is further configured to receive a first correspondence from a serving access network device of the terminal or from the terminal, where the first correspondence includes a correspondence between information about a plurality of antenna ports and information about a plurality of time errors, and each of the plurality of antenna ports is configured to send a corresponding positioning reference signal.

In a possible implementation, the sending unit is further configured to send third indication information to the serving access network device of the terminal, where the third indication information indicates to report the correspondence between the information about the antenna port and the information about the time error of the terminal.

In a possible implementation, the receiving unit is further configured to receive the first correspondence from the terminal, where the first correspondence includes the correspondence between the information about the plurality of antenna ports and the information about the plurality of time errors, and each of the plurality of antenna ports is configured to send the corresponding positioning reference signal.

In a possible implementation, the positioning apparatus further includes the sending unit. The sending unit is further configured to send fourth indication information to the terminal, where the fourth indication information indicates to report the correspondence between the information about the antenna port and the information about the time error of the terminal.

In a possible implementation, the processing unit is specifically configured to determine the location of the terminal based on the first correspondence and the positioning measurement information of the plurality of access network devices.

In a possible implementation, the information about the time error includes one or more of an index of the time error, a value of the time error, or a value range of the time error.

According to a sixth aspect, a positioning apparatus is provided, including a sending unit and a processing unit. The processing unit is configured to obtain a first correspondence. The first correspondence includes a correspondence between information about a plurality of antenna ports and information about a plurality of time errors. Each of the plurality of antenna ports is configured to send a corresponding positioning reference signal. The first correspondence is used to determine a location of the positioning apparatus. The sending unit is configured to send the first correspondence to a serving access network device or a location management function network element. The sending unit is further configured to send a corresponding positioning reference signal through one or more of the plurality of antenna ports.

In a possible implementation, the positioning apparatus further includes a receiving unit. The receiving unit is configured to receive configuration information from the serving access network device. The configuration information includes configuration information of a time-frequency resource of the positioning reference signal and configuration information of an antenna port of the positioning reference signal. The sending unit is specifically configured to send, on the time-frequency resource configured by using the configuration information, the corresponding positioning reference signal through the one or more antenna ports of the plurality of antenna ports configured by using the configuration information.

In a possible implementation, the positioning apparatus further includes the receiving unit. The receiving unit is configured to receive second indication information from the serving access network device or fourth indication information from the location management function network element. Both the second indication information and the fourth indication information indicate the positioning apparatus to report the correspondence between the information about the antenna port and the information about the time error. The sending unit is specifically configured to send the first correspondence to the serving access network device or the location management function network element under the indication of the second indication information or the fourth indication information.

According to a seventh aspect, a positioning apparatus is provided, including a processor. The processor is connected to a memory. The memory is configured to store computer-executable instructions. The processor executes the computer-executable instructions stored in the memory, to implement any method according to any one of the first aspect to the third aspect. For example, the memory and the processor may be integrated together, or may be independent components. If the memory and the processor are independent components, the memory may be located in the positioning apparatus, or may be located outside the positioning apparatus.

In a possible implementation, the processor includes a logic circuit, and further includes an input interface and/or an output interface. For example, the output interface is configured to perform a sending action in a corresponding method, and the input interface is configured to perform a receiving action in the corresponding method.

In a possible implementation, the positioning apparatus further includes a communication interface and a communication bus. The processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in the corresponding method.

In a possible implementation, the positioning apparatus exists in a product form of a chip.

According to an eighth aspect, a positioning apparatus is provided, including a processor, a memory, and a computer program that is stored in the memory and runs on the processor. When the computer program runs, the positioning apparatus is enabled to perform any method according to any one of the first aspect to the third aspect.

According to a ninth aspect, a positioning apparatus is provided, including a processor and an interface. The processor is coupled to a memory through the interface. When the processor executes a computer program or computer-executable instructions in the memory, any method according to any one of the first aspect to the third aspect is performed.

According to a tenth aspect, a computer-readable storage medium is provided, including computer-executable instructions. When the computer-executable instructions are run on a computer, the computer is enabled to perform any method according to any one of the first aspect to the third aspect.

According to an eleventh aspect, a computer program product is provided, including computer-executable instructions. When the computer executable instructions are run on a computer, the computer is enabled to perform any method according to any one of the first aspect to the third aspect.

For technical effects brought by any implementation of the fourth aspect to the eleventh aspect, refer to technical effects brought by a corresponding implementation of the first aspect and the third aspect.

It should be noted that the solutions in the foregoing aspects may be combined on the premise that the solutions are not contradictory.

DESCRIPTION OF EMBODIMENTS

In descriptions of this application, unless otherwise specified, "/" means "or". For example, A/B may represent A or B. A term "and/or" in this specification describes only an association relationship between associated objects and indicates that there may be at least three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used to represent giving an example, an illustration, or a description. Any embodiment or implementation scheme described as an "example" or "for example" in this application should not be explained as being more preferred or having more advantages than another embodiment or implementation scheme. Exactly, use of the term such as "example" or "for example" is intended to present a related concept in a specific manner.

The method provided in embodiments of this application may be applied to a long term evolution (LTE) system, a 5th generation (5G) system, a new radio (NR) system, a wireless local area network (WLAN) system and a future evolved system, or a plurality of converged communication systems. The 5G system may be a non-standalone (NSA) 5G system or a standalone (SA) 5G system. For ease of description, in embodiments of this application, an example in which the provided method is applied to a 5G system or an NR system is used to describe the method provided in embodiments of this application. When the method provided in embodiments of this application is applied to another system, it may be understood that a network element in embodiments of this application is replaced with a network element that has a same or similar function in a corresponding system.

An access network of the 5G system or the NR system may be referred to as a next generation (NG)-radio access network (RAN). The NG-RAN may include one or more access network devices. The access network device is an entity that is on a network side and that is configured to send a signal, or receive a signal, or send a signal and receive a signal, and is configured to provide a wireless communication function for a terminal. The access network device included in the NG-RAN may be a 5G station next-generation node base station (gNB), a 4G station next-generation evolved NodeB (ng-eNB) connected to a 5G core network, or the like. The access network device included in the NG-RAN may send and/or receive a positioning reference signal, and obtain related positioning measurement information.

Figure 1:
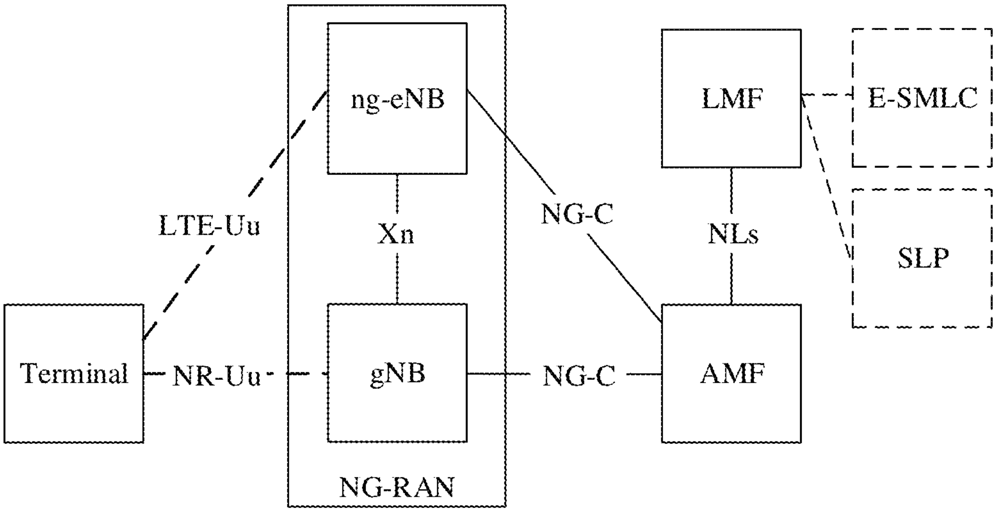
FIG. 1 is an example schematic diagram of a network architecture according to an embodiment of this application.

For a positioning architecture of an NG-RAN-based 5G core network, refer to FIG. 1. A location management function (LMF) is a network element, module, or component that is in a 5G core network and that provides a positioning function. An access and mobility management function (AMF) is a network element, module, or component that is in a 5G core network and that provides an access management function. An enhanced serving mobile location center (E-SMLC) is a network element, module, or component that is in a 4G core network and that provides a positioning function. A secure user plane location (SUPL) location platform (SUPL location platform, SLP) is a network element, module, or component that is in a 4G core network and that processes a user plane security location protocol. The ng-eNB is a device or apparatus that is deployed in a radio access network and that meets a 4G standard and that provides a wireless communication function for a terminal. The ng-eNB may be a base station in various forms, a transmission and reception point (TRP) that transmits and receives a reference signal, an access point, a reception point (RP), a transmission point (TP), or the like. The gNB is a device or apparatus that is deployed in a radio access network and that meets a 5G standard and that provides a wireless communication function for a terminal. The gNB may be a base station in various forms, a TRP that sends and receives a reference signal, a transmission measurement function (TMF), an access point, an RP, a TP, or the like. The terminal is an entity that is on a user side and that is configured to receive a signal, or send a signal, or receive a signal and send a signal. The terminal is configured to provide a user with one or more of a voice service and a data connectivity service. The terminal may be various device terminals with a wireless communication function, including a handheld terminal, a mobile phone, a cell phone, a computer, a wearable device, a tablet computer, a vehicle-mounted terminal, a factory machine, a factory device, a machine-type communication terminal, and the like. The terminal may also be referred to as user equipment (UE), a terminal device, an access terminal, a subscriber unit, a subscriber station, a mobile station, a remote station, a remote terminal, a mobile device, a user terminal, a wireless communication device, a user agent, or a user apparatus.

It should be noted that, in FIG. 1, a drawing example in which the NG-RAN includes one ng-eNB and one gNB is used. Actually, the NG-RAN may include more ng-eNBs and/or more gNBs. Access network devices that participate in terminal positioning in the NG-RAN may be all ng-eNBs, or may be all gNBs, or may be some ng-eNBs and some gNBs.

When positioning a terminal based on the positioning architecture shown in FIG. 1, the AMF receives a positioning request message (which may also be referred to as a positioning service request message) that is about a terminal and that is initiated by another network element in the network. The AMF sends the received positioning request message to a location management function network element (for example, the LMF), and the location management function network element is responsible for processing the received positioning request message and initiating a related positioning procedure.

To make embodiments of this application clearer, some concepts in embodiments of this application are first briefly described.

1. Time of Arrival (TOA)

In a positioning technology, a typical positioning method based on a transmission time of a signal between a terminal and different access network devices is a TOA-based positioning method. In the method, the terminal measures TOAs of positioning reference signals sent by different access network devices, or different access network devices measure TOAs of a positioning reference signal sent by the terminal, to obtain distance relationships between the terminal and the access network devices. Then, a location of the terminal is estimated with reference to information such as known location coordinates of the access network devices.

Figure 2:
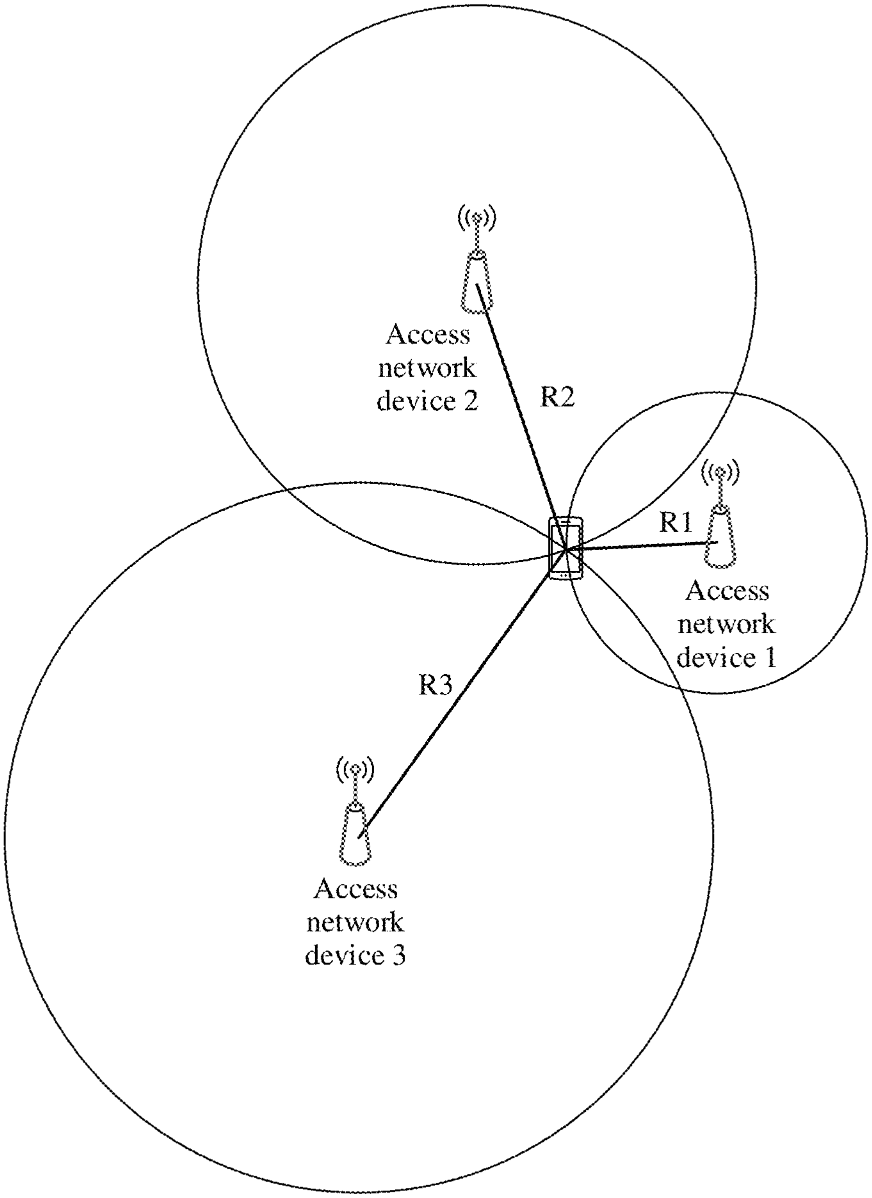
FIG. 2 is an example schematic diagram of a principle of TOA-based positioning.

Refer to FIG. 2. It may be understood that, if a transmission time of a signal between a terminal and different access network devices is determined, a distance between the terminal and each access network device may be obtained by multiplying the transmission time by a speed of light. By using each access network device as a circle center, and a distance from the access network device to the terminal as a radius, a plurality of circles may be obtained, and an intersection point of the plurality of circles is the location of the terminal. Specifically, an example in which TOA is an uplink-time difference of arrival (UL-TDOA) is used as an example. Different access network devices measure a relative time of arrival (RTOA) (that is, a TOA relative to a time point) of an uplink positioning reference signal (namely, sounding reference signal (SRS)) sent by the terminal, and report measurement information to a location management function network element (for example, the LMF). The location management function network element performs a differential operation on RTOAs of the different access network devices, calculates a distance difference between the terminal and the different access network devices, and then calculates the location of the terminal based on location information of the access network devices.

2. Time Error

It can be learned from the foregoing descriptions that different antenna panels (or different radio frequency links/radio frequency channels) have different time errors, that is, when the different antenna panels (or the different radio frequency links/radio frequency channels) are used to receive and send signals, different measured TOA values have different time errors. It can be understood that a processing delay is related to a plurality of factors (for example, a hardware parameter, quality, a temperature, and noise). Therefore, a time error is also related to these factors. Time errors of receiving and sending signals on a same antenna panel (or a same radio frequency link/radio frequency channel) at different moments are not exactly the same, but there is correlation, that is, time errors of receiving and sending signals on a same antenna panel (or a same radio frequency link/radio frequency channel) at different moments may be considered to be stable (that is, little-changed).

A plurality of related time error values of receiving and sending signals on a same antenna panel (or a same radio frequency link/radio frequency channel) at different moments may be considered to belong to one time error group (TEG), and the TEG may also have another name. This is not limited in this application. Based on this, the time error in the following may also be replaced with TEG, or other descriptions having the same meaning as that represented by TEG.

3. Antenna Port

An antenna port represents a logical transmit channel, and may be mapped to a physical antenna array element. Physical transmit channels (that is, channels) of different antenna ports may be considered to be different from each other. Therefore, time errors corresponding to different antenna ports may also be considered to be independent of each other. One antenna panel includes a plurality of antenna array elements, and one antenna port is corresponding to one or more antenna array elements in an antenna panel.

Figure 3:
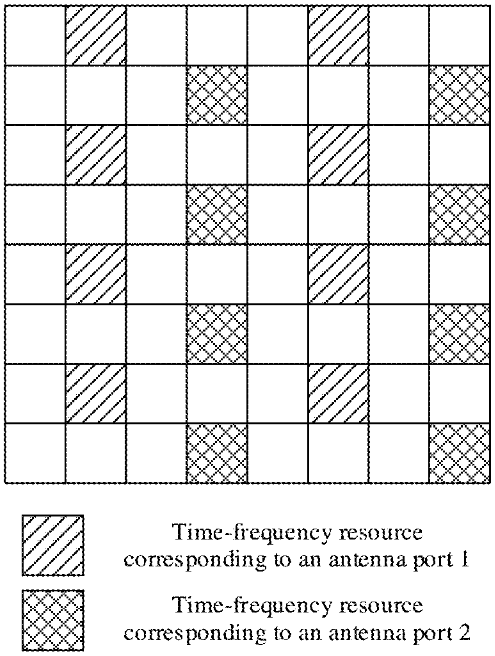
FIG. 3 is an example schematic diagram of a time-frequency resource corresponding to an antenna port.

In embodiments of this application, positioning reference signals sent on different antenna ports are considered as different positioning reference signals. For example, if a positioning reference signal is an SRS, SRS resources are SRS resources of two antenna ports. As shown in FIG. 3, some of SRS time-frequency resources in the SRS resource are time-frequency resources corresponding to an antenna port 1, and the other SRS time-frequency resources are time-frequency resources corresponding to an antenna port 2. Therefore, SRSs sent on the antenna port 1 and the antenna port 2 may be considered as different SRSs. It should be noted that, in FIG. 3, an example in which two antenna ports correspond to different time-frequency resources is used for description. In actual implementation, the time-frequency resources corresponding to the two antenna ports may also be the same. In this case, SRSs sent on different antenna ports may be distinguished by using a code domain resource. The foregoing briefly describes some concepts in this application.

Based on the understanding of the foregoing time error, when a terminal sends positioning reference signals through different antenna ports in a multi-antenna panel scenario, different time errors exist between TOAs obtained through measurement by different access network devices. However, positioning precision during terminal positioning based on the TOA depends on estimation precision of the TOA, and the estimation precision of the TOA is limited, so that positioning precision of the terminal is also limited. For example, if a serving access network device indicates a terminal to send a positioning reference signal at t1, the terminal sends the positioning reference signal through an antenna port 1, an antenna port 2, and an antenna port 3. A time error of the antenna port 1 ranges from 1 ns (ns) to 2 ns, a time error of the antenna port 2 ranges from 2 ns to 3 ns, and a time error of the antenna port 3 ranges from 0 to 1 ns. The positioning reference signal is transmitted in space for 0.5 ms (ms). Therefore, a time range in which an access network device 1 receives the positioning reference signal sent by the terminal on the antenna port 1 is t1+1 ns+0.5 ms to t1+2 ns+0.5 ms, a time range in which an access network device 2 receives the positioning reference signal sent by the terminal on the antenna port 2 is t1+2 ns+0.5 ms to t1+3 ns+0.5 ms, and a time range in which an access network device 3 receives the positioning reference signal sent by the terminal on the antenna port 3 is t1+0.5 ms to t1+1 ns+0.5 ms. In this case, the access network device 1 considers that the positioning reference signal is transmitted in space for 1 ns+0.5 ms to 2 ns+0.5 ms, the access network device 2 considers that the positioning reference signal is transmitted in space for 2 ns+0.5 ms to 3 ns+0.5 ms, and the access network device 3 considers that the positioning reference signal is transmitted in space for 0.5 ms to 1 ns+0.5 ms. Actually, the positioning reference signal is transmitted in space for 0.5 ms. In this case, if a location of the terminal is determined based on the transmission times measured by the access network device 1, the access network device 2, and the access network device 3, because time errors on different antenna ports cannot be cancelled through calculation, the determined location of the terminal is not accurate enough.

Figure 4:
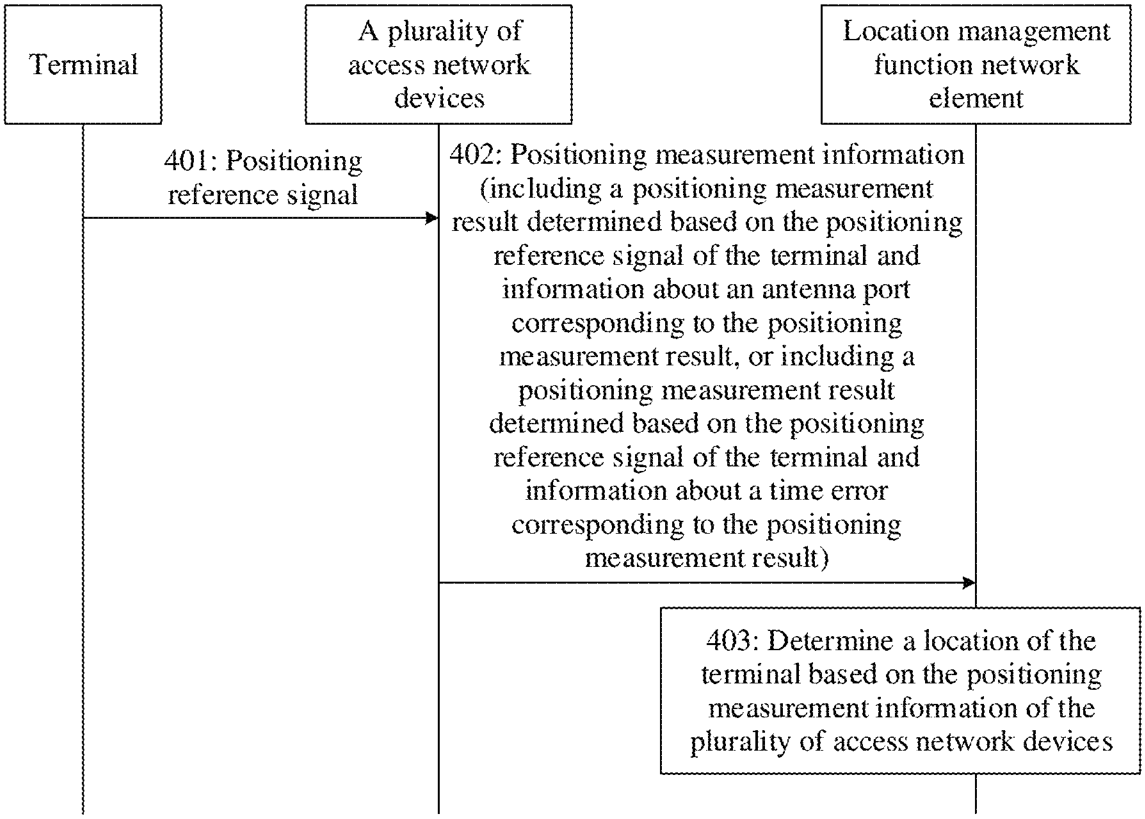
FIG. 4 is an example flowchart of a positioning method according to an embodiment of this application.

To improve positioning precision of a terminal, this application provides a positioning method. In the positioning method, when reporting a positioning measurement result to a location management function network element, an access network device may report information about an antenna port corresponding to the positioning measurement result or information about a time error corresponding to the positioning measurement result. The location management function network element may group or calibrate positioning measurement results based on the information about the antenna port or the information about the time error, and perform positioning resolution by using the grouped or calibrated positioning measurement results to determine a location of a terminal, to eliminate impact of time errors corresponding to different antenna ports on the positioning result. As shown in FIG. 4, the positioning method specifically includes the following steps.

401: A terminal sends a positioning reference signal. Correspondingly, a plurality of access network devices receive the positioning reference signal from the terminal.

An action performed by the terminal in this application may be performed by the terminal, or may be performed by one/some modules in the terminal, for example, may be performed by a chip in the terminal. The plurality of access network devices are access network devices that participate in terminal positioning, and the plurality of access network devices may include a serving access network device of the terminal, or may not include a serving access network device of the terminal.

The positioning reference signal may be an SRS dedicated to positioning, or may be an SRS in a multiple-input multiple-output (MIMO) system.

During specific implementation of step 401, the terminal sends corresponding positioning reference signals on a plurality of antenna ports. Correspondingly, each of the plurality of access network devices receives the corresponding positioning reference signals on the plurality of antenna ports. It should be noted that, in embodiments of this application, positioning reference signals sent on different antenna ports are considered as different positioning reference signals.

For example (denoted as an example 1), the terminal may send a positioning reference signal 1 on an antenna port 1, send a positioning reference signal 2 on an antenna port 2, and send a positioning reference signal 3 on an antenna port 3. Correspondingly, each of the plurality of access network devices receives the positioning reference signal 1 at the antenna port 1, receives the positioning reference signal 2 at the antenna port 2, and receives the positioning reference signal 3 at the antenna port 3.

Optionally, the method further includes: The serving access network device sends configuration information to the terminal. Correspondingly, the terminal receives the configuration information from the serving access network device. The configuration information includes configuration information of a time-frequency resource of the positioning reference signal and configuration information of an antenna port of the positioning reference signal. In this case, the terminal sends the corresponding positioning reference signal on the antenna port based on the configuration information. Specifically, the terminal may send, on the time-frequency resource configured by using the configuration information, the corresponding positioning reference signal through one or more of the plurality of antenna ports configured by using the configuration information. The configuration information may be carried in a configuration message.

The configuration information of the antenna port may include a quantity of antenna ports and/or a port number of the antenna port. If the configuration information of the antenna port includes the quantity of antenna ports, the terminal independently determines, based on the quantity of antenna ports, the antenna port for sending the positioning reference signal, and sends the corresponding positioning reference signal on the determined antenna port by using the configured time-frequency resource. If the configuration information of the antenna port includes the port number of the antenna port, the terminal sends, by using the configured time-frequency resource, the corresponding positioning reference signal on the antenna port corresponding to the port number of the antenna port.

402: The plurality of access network devices send positioning measurement information to a location management function network element. Correspondingly, the location management function network element receives the positioning measurement information from the plurality of access network devices.

The location management function network element may be an LMF, an E-SMLC, or another function network element used for positioning management.

The positioning measurement information may have the following two cases.

Case 1: The positioning measurement information includes a positioning measurement result determined based on the positioning reference signal of the terminal and information about an antenna port corresponding to the positioning measurement result. The antenna port is an antenna port of the positioning reference signal on which the positioning measurement result is based.

In Case 1, based on the example 1, each of the plurality of access network devices may determine a positioning measurement result 1 based on the positioning reference signal 1 sent by the terminal on the antenna port 1, determine a positioning measurement result 2 based on the positioning reference signal 2 sent by the terminal on the antenna port 2, and determine the positioning measurement result 3 based on the positioning reference signal 3 sent by the terminal on the antenna port 3. Finally, each of the plurality of access network devices sends the positioning measurement result 1 and information about the antenna port 1 corresponding to the positioning measurement result 1, the positioning measurement result 2 and information about the antenna port 2 corresponding to the positioning measurement result 2, and the positioning measurement result 3 and information about the antenna port 3 corresponding to the positioning measurement result 3 to the location management function network element. For example, the information sent by the access network device to the location management function network element may be shown in Table 1.

TABLE 1

| Positioning measurement result | Information about an antenna port corresponding to the positioning measurement result |
|---|---|
| Positioning measurement result 1 | Information about an antenna port 1 |
| Positioning measurement result 2 | Information about an antenna port 2 |
| Positioning measurement result 3 | Information about an antenna port 3 |

Case 2: The positioning measurement information includes a positioning measurement result determined based on the positioning reference signal of the terminal and information about a time error corresponding to the positioning measurement result. The time error is a time error corresponding to an antenna port of the positioning reference signal on which the positioning measurement result is based.

In Case 2, based on the example 1, each of the plurality of access network devices may determine a positioning measurement result 1 based on the positioning reference signal 1 sent by the terminal on the antenna port 1, determine a positioning measurement result 2 based on the positioning reference signal 2 sent by the terminal on the antenna port 2, and determine the positioning measurement result 3 based on the positioning reference signal 3 sent by the terminal on the antenna port 3. Finally, each of the plurality of access network devices sends the positioning measurement result 1 and information about a time error (denoted as time error information 1) corresponding to the antenna port 1 corresponding to the positioning measurement result 1, the positioning measurement result 2 and information about a time error (denoted as time error information 2) corresponding to the antenna port 2 corresponding to the positioning measurement result 2, and the positioning measurement result 3 and information about a time error (denoted as time error information 3) corresponding to the antenna port 3 corresponding to the positioning measurement result 3 to the location management function network element. For example, the information sent by the access network device to the location management function network element may be shown in Table 2.

TABLE 2

| Positioning measurement result | Information about a time error corresponding to the positioning measurement result |
|---|---|
| Positioning measurement result 1 | Time error information 1 |
| Positioning measurement result 2 | Time error information 2 |
| Positioning measurement result 3 | Time error information 3 |

In Case 1 and Case 2, the positioning measurement result may be a TOA (for example, an RTOA or a time difference of arrival (time difference of arrival, TDOA)). The information about the antenna port may be a port number of the antenna port. The information about the time error includes one or more of an index of the time error, a value (for example, a mean or a variance) of the time error, a value range of the time error, or a distribution function of the time error. The information about the time error may alternatively be other information that can distinguish between different time errors. For example, positioning measurement results corresponding to information about different time errors may be carried in data packets with different names. In this case, the location management function network element may determine, based on the names of the data packets, which positioning measurement results correspond to information about a same time error. Similarly, the information about the antenna port may alternatively be other information that can distinguish between different antenna ports.

In both Case 1 and Case 2, the antenna port is an antenna port of the terminal.

In Case 1 and Case 2, it should be noted that when the terminal sends the positioning reference signal through N (N is an integer greater than 1) antenna ports, a quantity of positioning measurement results sent by the access network device to the location management function network element may be equal to N or may be less than N. In other words, the access network device may determine a positioning measurement result based on positioning reference signals sent by the terminal on a part or all of the N antenna ports, and send the positioning measurement results and information about an antenna port corresponding to the positioning measurement result or information about a time error corresponding to the positioning measurement result to the location management function network element. For example, the terminal sends three positioning reference signals through three antenna ports, and the access network device may detect a positioning reference signal sent by the terminal on only one antenna port (assuming that the antenna port is an antenna port 1) of the three antenna ports. In this case, the access network device may determine a positioning measurement result based on the positioning reference signal sent by the terminal on the antenna port 1, and send the positioning measurement result and information about the antenna port 1 or information about a time error corresponding to the antenna port 1 to the location management function network element. For another example, the terminal sends three positioning reference signals through three antenna ports, and the access network device detects the three positioning reference signals. The access network device may determine a positioning measurement result based on a positioning reference signal with maximum energy in the three positioning reference signals, and send the positioning measurement result and information about an antenna port 2 (that is, an antenna port corresponding to the positioning reference signal with maximum energy) or information about a time error corresponding to the antenna port 2 to the location management function network element.

Optionally, before step 402, the method further includes: The location management function network element sends first indication information to the plurality of access network devices, where the first indication information indicates to report the information about the antenna port corresponding to the positioning measurement result, or the first indication information indicates to report the information about the time error corresponding to the positioning measurement result. Correspondingly, the plurality of access network devices receive the first indication information from the location management function network element. In this case, during specific implementation, step 402 may include: The plurality of access network devices send the positioning measurement information to the location management function network element based on the first indication information.

It may be understood that if the first indication information indicates to report the information about the antenna port corresponding to the positioning measurement result, the positioning measurement information sent by the plurality of access network devices to the location management function network element based on the first indication information is that in Case 1. If the first indication information indicates to report the information about the time error corresponding to the positioning measurement result, the positioning measurement information sent by the plurality of access network devices to the location management function network element based on the first indication information is that in Case 2.

If the positioning measurement information is that in Case 2, the method further includes:

(11) The plurality of access network devices determine the positioning measurement result based on the positioning reference signal.

(12) The plurality of access network devices determine, based on the information about the antenna port corresponding to the positioning measurement result and a first correspondence, the information about the time error corresponding to the positioning measurement result.

The first correspondence includes a correspondence between information about a plurality of antenna ports and information about a plurality of time errors of the terminal, and each of the plurality of antenna ports is configured to send a corresponding positioning reference signal. For example, it is assumed that the terminal has four antenna ports. For a correspondence between information about an antenna port and information about a time error, refer to Table 3. Based on the example 1, after determining the positioning measurement result 1, the positioning measurement result 2, and the positioning measurement result 3, the access network device determines that antenna ports corresponding to the positioning measurement result 1, the positioning measurement result 2, and the positioning measurement result 3 are the antenna port 1, the antenna port 2, and the antenna port 3. Then, based on the first correspondence, the access network device determines that time error information corresponding to the antenna port 1, the antenna port 2, and the antenna port 3 is the time error information 1, the time error information 2, and the time error information 3. Therefore, the access network device determines that the positioning measurement result 1, the positioning measurement result 2, and the positioning measurement result 3 are respectively corresponding to the time error information 1, the time error information 2, and the time error information 3.

TABLE 3

| Antenna port | Time error information corresponding to the antenna port |
|---|---|
| Information about an antenna port 1 | Time error information 1 |
| Information about an antenna port 2 | Time error information 2 |
| Information about an antenna port 3 | Time error information 3 |
| Information about an antenna port 4 | Time error information 4 |

If the plurality of access network devices include a serving access network device of the terminal, a method for obtaining the first correspondence by the serving access network device may be the following method (1) or method (2).

Method (1): The terminal sends the first correspondence to the serving access network device. Correspondingly, the serving access network device receives the first correspondence from the terminal. The first correspondence may be carried in capability information of the terminal, or may be separately sent to the serving access network device. Specifically, the serving access network device may send second indication information to the terminal, and the terminal sends the first correspondence to the service access network device based on the second indication information. The second indication information indicates the terminal to report a correspondence between the information about the antenna port and the information about the time error. It should be noted that the terminal does not depend on the second indication information to report the first correspondence to the serving access network device. In other words, even if there is no second indication information, the terminal may still report the first correspondence to the serving access network device. For example, if the capability information of the terminal includes the first correspondence by default or according to a protocol, the terminal may report the first correspondence to the access network device when reporting the capability information.

Method (2): The location management function network element sends the first correspondence to the serving access network device. Correspondingly, the serving access network device receives the first correspondence from the location management function network element. For a manner in which the location management function network element obtains the first correspondence, refer to the following descriptions.

A method for obtaining the first correspondence by an access network device that is not the serving access network device of the terminal in the plurality of access network devices includes: The location management function network element sends the first correspondence to the access network device. Correspondingly, the access network device receives the first correspondence from the location management function network element.

The location management function network element may obtain the first correspondence in the following Manner 1 or Manner 2.

Manner 1: The location management function network element receives the first correspondence from the serving access network device of the terminal. Specifically, the location management function network element may send third indication information to the serving access network device of the terminal, where the third indication information indicates to report the correspondence between the information about the antenna port and the information about the time error of the terminal. The serving access network device receives the third indication information from the location management function network element, and sends the first correspondence to the location management function network element based on the third indication information. For a process in which the serving access network device obtains the first correspondence, refer to the foregoing descriptions.

It should be noted that the serving access network device does not depend on the third indication information to report the first correspondence to the location management function network element. In other words, even if there is no third indication information, the serving access network device of the terminal may still report the first correspondence to the location management function network element. For example, when the access network device reports the first correspondence corresponding to the terminal to the location management function network element by default or according to a protocol, the access network device may report the first correspondence corresponding to the one or more terminals served by the access network device to the location management function network element. A first correspondence corresponding to a terminal includes a correspondence between information about a plurality of antenna ports and information about a plurality of time errors of the terminal.

Manner 2: The location management function network element receives the first correspondence from the terminal. Specifically, the location management function network element sends fourth indication information to the terminal, where the fourth indication information indicates to report the correspondence between the information about the antenna port and the information about the time error of the terminal. The terminal receives the fourth indication information from the location management function network element, and sends the first correspondence to the location management function network element based on the fourth indication information.

The terminal may send the first correspondence to the location management function network element by using an LTE positioning protocol (LPP) layer between the terminal and the location management function network element. The first correspondence may be carried in capability information of the terminal. It should be noted that the terminal does not depend on the fourth indication information to report the first correspondence to the location management function network element. In other words, even if there is no fourth indication information, the terminal may still report the first correspondence to the location management function network element. For example, when the location management function network element locates the terminal, the terminal may also report the capability information. The capability information may include the first correspondence corresponding to the terminal by default or according to a protocol. In this case, when the terminal reports the capability information, the terminal reports the first correspondence corresponding to the terminal to the location management function network element.

Information about a time error corresponding to each antenna port of the terminal may be configured in the terminal before delivery, or may be estimated by the terminal in a subsequent communication process.

It should be noted that the first correspondence in the access network device may alternatively be not reported by the terminal to the access network device, but obtained by the access network device through measurement. For example, the access network device may receive, by using a same antenna panel, positioning reference signals sent by the terminal through different antenna ports, determine, based on the received positioning reference signals, a difference of information about time errors between the different antenna ports, and further determine the information about time errors corresponding to the different antenna ports. In this case, the information about time errors corresponding to different antenna ports may be relative information about time errors based on an antenna port. For example, the access network device receives, by using a same antenna panel, positioning reference signals sent by the terminal through the antenna port 1, the antenna port 2, and the antenna port 3, and determines that positioning measurement results are respectively 10 ns, 12 ns, and 12.5 ns. In this case, information about a time error corresponding to the antenna port 1 may be 0, information about a time error corresponding to the antenna port 2 may be 12 ns−10 ns=2 ns, and information about a time error corresponding to the antenna port 3 may be 12.5 ns−10 ns=2.5 ns.

It should be noted that, after obtaining the first correspondence corresponding to the terminal, the access network device may maintain the first correspondence corresponding to the terminal, for example, store the first correspondence corresponding to the terminal in a context of the terminal.

403: The location management function network element determines a location of the terminal based on the positioning measurement information of the plurality of access network devices.

During specific implementation, step 403 may include: The location management function network element groups positioning measurement results in the positioning measurement information of the plurality of access network devices based on the information about the antenna port or the information about the time error in the positioning measurement information of the plurality of access network devices.

It should be noted that if the positioning measurement information is that in Case 1, the location management function network element may group the positioning measurement results in the positioning measurement information of the plurality of access network devices based on the information about the antenna port, or may determine, based on the first correspondence, the information about the time error corresponding to the antenna port, and group the positioning measurement results in the positioning measurement information of the plurality of access network devices based on the information about the time error. If the positioning measurement information is that in Case 2, the location management function network element may group the positioning measurement results in the positioning measurement information of the plurality of access network devices based on the information about the time error.

When the positioning measurement results in the positioning measurement information of the plurality of access network devices are grouped, positioning measurement results corresponding to a port number of a same antenna port may be grouped into one group. For the information about the time error, positioning measurement results corresponding to the same information about the time error may be grouped into one group (for example, positioning measurement results corresponding to an index of a same time error may be grouped into one group, positioning measurement results corresponding to a value of a same time error may be grouped into one group, or positioning measurement results corresponding to a value range of a same time error may be grouped into one group).

It should be noted that, in embodiments of this application, the information about time errors corresponding to different antenna ports of the terminal may be the same or different. This is not limited in this application. If the information about the time errors corresponding to the plurality of antenna ports is the same, the positioning measurement results corresponding to the plurality of antenna ports may be grouped into one group, and are jointly used to determine the location of the terminal, or may be grouped into a plurality of groups (one group is corresponding to one antenna port).

Step 403 may be specifically implemented by using the following Manner 3, Manner 4, or Manner 5.

Manner 3: The location management function network element determines the location of the terminal based on a positioning measurement result corresponding to information about an antenna port or a positioning measurement result corresponding to information about a time error.

Specifically, the location management function network element determines the location of the terminal based on a positioning measurement result that is in the positioning measurement information of the plurality of access network devices and that corresponds to information about a first antenna port or that corresponds to information about a first time error. The first antenna port is an antenna port used by the terminal to send the positioning reference signal. The first time error is a time error corresponding to an antenna port used by the terminal to send the positioning reference signal. Alternatively, if information about time errors corresponding to a plurality of antenna ports is the same, the first time error is a time error corresponding to the plurality of antenna ports.

For example, if the terminal separately sends a positioning reference signal 1 and a positioning reference signal 2 through an antenna port 1 and an antenna port 2, and five access network devices participate in terminal positioning, each of the five access network devices may obtain two positioning measurement results based on two positioning reference signals sent by the terminal, and the two positioning measurement results are respectively corresponding to the antenna port 1 and the antenna port 2. In this case, the location management function network element receives 10 positioning measurement results. Five positioning measurement results correspond to the antenna port 1, and the other five positioning measurement results correspond to the antenna port 2. The location management function network element may determine the location of the terminal by using the five positioning measurement results corresponding to the antenna port 1, or may determine the location of the terminal by using the five positioning measurement results corresponding to the antenna port 2.

Manner 4: The location management function network element determines a location of a terminal based on each group obtained by grouping, and then determines the location of the terminal based on these locations.

Specifically, the location management function network element groups the positioning measurement results in the positioning measurement information of the plurality of access network devices into M positioning measurement result groups, and positioning measurement results in each positioning measurement result group correspond to information about a same antenna port or information about a same time error. The location management function network element locates the terminal based on the M positioning measurement result groups to obtain M positioning results, and the location management function network element determines the location of the terminal based on the M positioning results, where M is an integer greater than 0.

For example, if the terminal separately sends a positioning reference signal 1 and a positioning reference signal 2 through an antenna port 1 and an antenna port 2, and five access network devices participate in terminal positioning, each of the five access network devices may obtain two positioning measurement results based on two positioning reference signals sent by the terminal, and the two positioning measurement results are respectively corresponding to the antenna port 1 and the antenna port 2. In this case, the location management function network element receives 10 positioning measurement results. Five positioning measurement results correspond to the antenna port 1, and the other five positioning measurement results correspond to the antenna port 2. The location management function network element may determine a location of the terminal by using the five positioning measurement results corresponding to the antenna port 1, determine another location of the terminal by using the five positioning measurement results corresponding to the antenna port 2, and then determine the location of the terminal based on the two locations.

In Manner 3 and Manner 4, because time errors corresponding to a same antenna port are correlated, impact of the time error on the positioning result can be eliminated when the location of the terminal is determined by using a differential operation based on the positioning measurement result corresponding to the information about the same antenna port or the positioning measurement result corresponding to the information about the same time error. In this way, positioning precision of the terminal is improved.

Manner 5. The location management function network element calibrates the positioning measurement results in the positioning measurement information of the plurality of access network devices based on the first correspondence, and the location management function network element locates the terminal based on a calibrated positioning measurement results in the positioning measurement information of the plurality of access network devices.

If the information about the time error in the first correspondence includes a value of the time error, a method for calibrating a positioning measurement result by the location management function network element includes: The location management function network element subtracts the value of the time error corresponding to the positioning measurement result from the positioning measurement result to obtain a calibrated positioning measurement result.

If the information about the time error in the first correspondence includes a value range of the time error, a method for calibrating the positioning measurement result by the location management function network element may be the following method 1 or method 2. Method 1: The location management function network element subtracts a first value from the positioning measurement result to obtain a calibrated positioning measurement result, where the first value may be an average of a maximum value and a minimum value in the value range of the time errors corresponding to the positioning measurement result. Method 2: The time error is used as an unknown parameter, the unknown parameter is calculated, and after a calculation result is obtained, the calculation result is subtracted from the positioning measurement result, to obtain a calibrated positioning measurement result.

If the information about the time error in the first correspondence includes a distribution function of the time error, a method for calibrating the positioning measurement result by the location management function network element includes: The location management function network element subtracts a second value from the positioning measurement result to obtain a calibrated positioning measurement result, where the second value may be a variance or an average value of the distribution function of the time error corresponding to the positioning measurement result.

For example, it is assumed that the information about the time error in the first correspondence includes a value of the time error. If the terminal separately sends a positioning reference signal 1 and a positioning reference signal 2 through an antenna port 1 and an antenna port 2, and five access network devices participate in terminal positioning, each of the five access network devices may obtain two positioning measurement results based on two positioning reference signals sent by the terminal, and the two positioning measurement results are respectively corresponding to the antenna port 1 and the antenna port 2. In this case, the location management function network element receives 10 positioning measurement results. Five positioning measurement results correspond to the antenna port 1, and the other five positioning measurement results correspond to the antenna port 2. That the location management function network element calibrates the five positioning measurement results corresponding to the antenna port 1 specifically includes: subtracting a value of a time error corresponding to the antenna port 1 from each positioning measurement result, to obtain a calibrated positioning measurement result. That the location management function network element calibrates the five positioning measurement results corresponding to the antenna port 2 specifically includes: subtracting a value of a time error corresponding to the antenna port 2 from each positioning measurement result, to obtain a calibrated positioning measurement result. The location management function network element determines the location of the terminal by using 10 calibrated positioning measurement results.

The foregoing method for calibrating the positioning measurement result is merely an example. In actual implementation, there may be another method. This is not limited in this application.

In Manner 5, the positioning measurement results are calibrated, so that the positioning measurement results corresponding to different antenna ports may be jointly used to determine the location of the terminal.

It may be understood that, in addition to the time error of the antenna port of the terminal, the antenna panel of the access network device also has a time error. Therefore, to further improve positioning precision of the terminal, before determining the location of the terminal based on the positioning measurement information of the plurality of access network devices, the location management function network element may calibrate the positioning measurement result based on the information about the time error corresponding to the antenna panel of the access network device. In this case, for the foregoing Manner 5, the location management function network element may perform two calibrations. In one calibration, the positioning measurement result is calibrated based on the information about the time error corresponding to the antenna panel of the access network device.

In the other calibration, the positioning measurement result is calibrated based on the information about the time error corresponding to the antenna port of the terminal.

In this case, optionally, before step 403, the method further includes:

(21) The plurality of access network devices send, to the location management function network element, information about an antenna panel corresponding to a respective positioning measurement result, or information about a time error corresponding to an antenna panel corresponding to the positioning measurement result. Correspondingly, the location management function network element receives the information about the antenna panel corresponding to the positioning measurement result or the information about the time error corresponding to the antenna panel corresponding to the positioning measurement result that is sent by each of the plurality of access network devices. The antenna panel corresponding to the positioning measurement result is an antenna panel configured to receive the positioning reference signal corresponding to the positioning measurement result.

(22) The location management function network element calibrates the positioning measurement results based on information about antenna panels corresponding to the positioning measurement results sent by the plurality of access network devices, or information about time errors corresponding to antenna panels corresponding to the positioning measurement results.

The information about the antenna panel may be a panel number of the antenna panel.

For ease of description, positioning measurement information before this optional method may be referred to as first positioning measurement information. Information about an antenna panel corresponding to a positioning measurement result or information about a time error corresponding to an antenna panel corresponding to a positioning measurement result in the optional method may be referred to as second positioning measurement information. It may be understood that each of the plurality of access network devices corresponds to one piece of second positioning measurement information.

In step (22), if the information sent by the plurality of access network devices is the information about the antenna panel corresponding to the positioning measurement result, the location management function network element may determine, based on a second correspondence, the information about the time error corresponding to the antenna panel corresponding to the positioning measurement result. Then, the location management function network element calibrates the positioning measurement result based on the information about the time error corresponding to the antenna panel corresponding to the positioning measurement result. The second correspondence includes a correspondence between the antenna panel of the access network device and the information about the time error.

For example, as shown in Table 4, if the terminal separately sends a positioning reference signal 1, a positioning reference signal 2, a positioning reference signal 3, and a positioning reference signal 4 through an antenna port 1, an antenna port 2, an antenna port 3, and an antenna port 4, and three access network devices participate in terminal positioning, antenna panels 1 of the three access network devices receive the positioning reference signal 1 and the positioning reference signal 2 that are sent on the antenna port 1 and the antenna port 2, and antenna panels 2 of the three access network devices receive the positioning reference signal 3 and the positioning reference signal 4 that are sent on the antenna port 3 and the antenna port 4. Therefore, each access network device may obtain four positioning measurement results based on the four positioning reference signals sent by the terminal, and the location management function network element receives 12 positioning measurement results. The location management function network element may calibrate, based on information about a time error corresponding to the antenna panel 1 of the access network device 1, a positioning measurement result determined based on the positioning reference signal 1 and the positioning reference signal 2 that are received by the antenna panel 1, calibrate, based on information about a time error corresponding to the antenna panel 2 of the access network device 1, a positioning measurement result determined based on the positioning reference signal 3 and the positioning reference signal 4 that are received by the antenna panel 2, and correspondingly calibrates antenna panels of other access network devices. A calibration method is similar to the foregoing Manner 5, and reference may be made to Manner 5 for understanding.

TABLE 4

| Antenna port of a terminal | Antenna panel of an access network device 1 | Antenna panel of an access network device 2 | Antenna panel of an access network device 3 |
|---|---|---|---|
| Antenna port 1<br>Antenna port 2 | Antenna panel 1 | Antenna panel 1 | Antenna panel 1 |
| Antenna port 3<br>Antenna port 4 | Antenna panel 2 | Antenna panel 2 | Antenna panel 2 |

It should be noted that, in another case, the positioning measurement information may also include a positioning measurement result determined based on the positioning reference signal of the terminal, information about an antenna port corresponding to the positioning measurement result, and information about a time error corresponding to the positioning measurement result. In this case, the first indication information may indicate to report the information about the antenna port and the information about the time error that are corresponding to the positioning measurement result. In this case, during implementation of step 403, the location management function network element may group the positioning measurement results in the positioning measurement information of the plurality of access network devices based on the information about the antenna port, or may group the positioning measurement results in the positioning measurement information of the plurality of access network devices based on the information about the time error.

According to the method provided in embodiments of this application, when reporting the positioning measurement result to the location management function network element, the access network device may report the information about the antenna port corresponding to the positioning measurement result or the information about the time error corresponding to the positioning measurement result. The location management function network element may group or calibrate positioning measurement results based on the information about the antenna port or the information about the time error, and perform positioning resolution by using the grouped or calibrated positioning measurement results to determine the location of the terminal, to eliminate impact of time errors corresponding to different antenna ports on the positioning result, and improve positioning precision of the terminal.

To make embodiments of this application clearer, the following describes the foregoing embodiments by using embodiments shown in FIG. 5A and FIG. 5B and FIG. 6A and FIG. 6B. In the embodiments shown in FIG. 5A and FIG. 5B and FIG. 6A and FIG. 6B, an example in which the location management function network element is an LMF is used. A difference between the embodiment shown in FIG. 5A and FIG. 5B and the embodiment shown in FIG. 6A and FIG. 6B lies in that, in the embodiment shown in FIG. 5A and FIG. 5B, a first correspondence is sent by a serving access network device to the LMF, and in the embodiment shown in FIG. 6A and FIG. 6B, a first correspondence is sent by a terminal to the LMF.

Figure 5A:
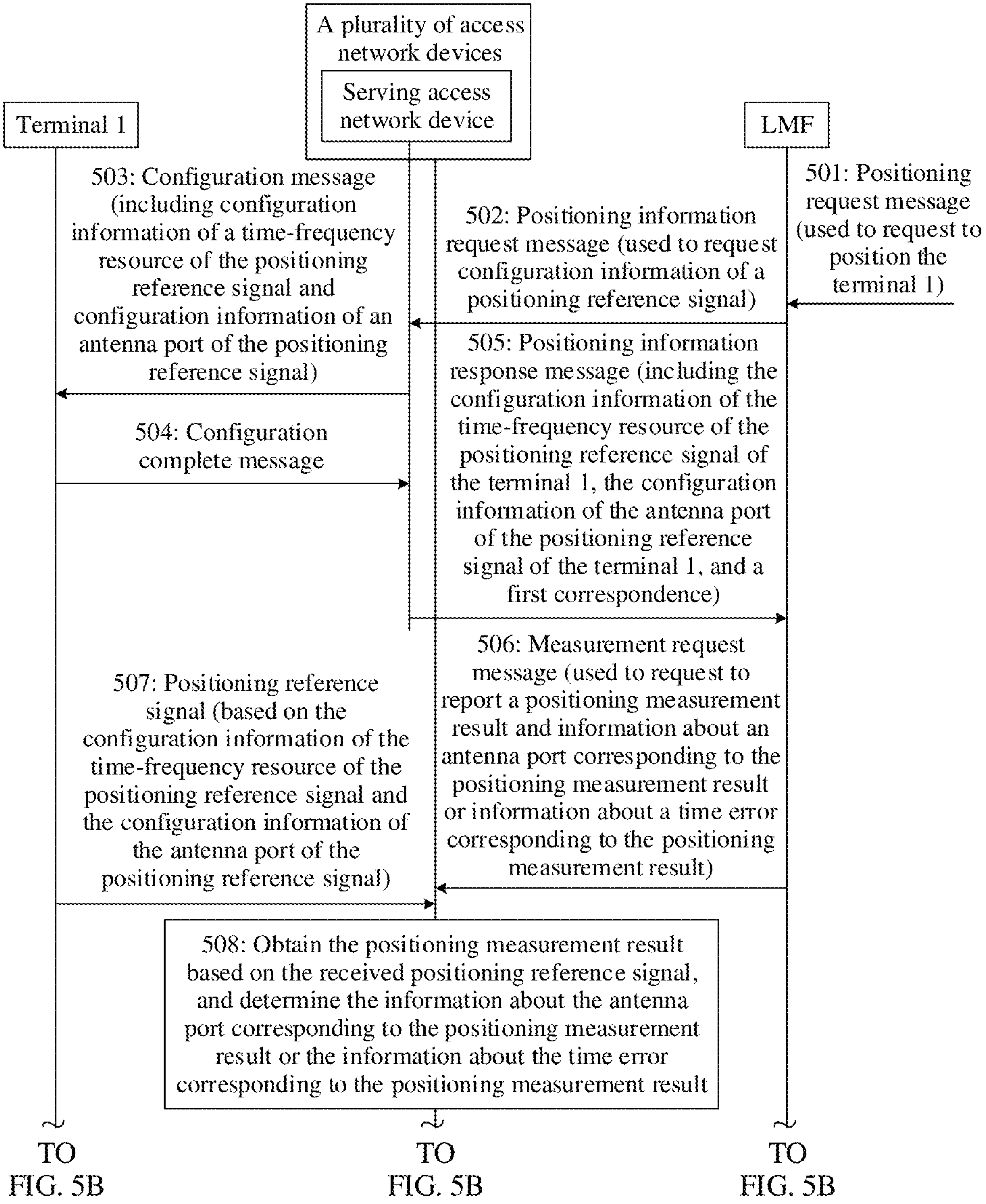
FIG. 5A and FIG. 5B are example flowcharts of another positioning method according to an embodiment of this application.
Figure 5B:
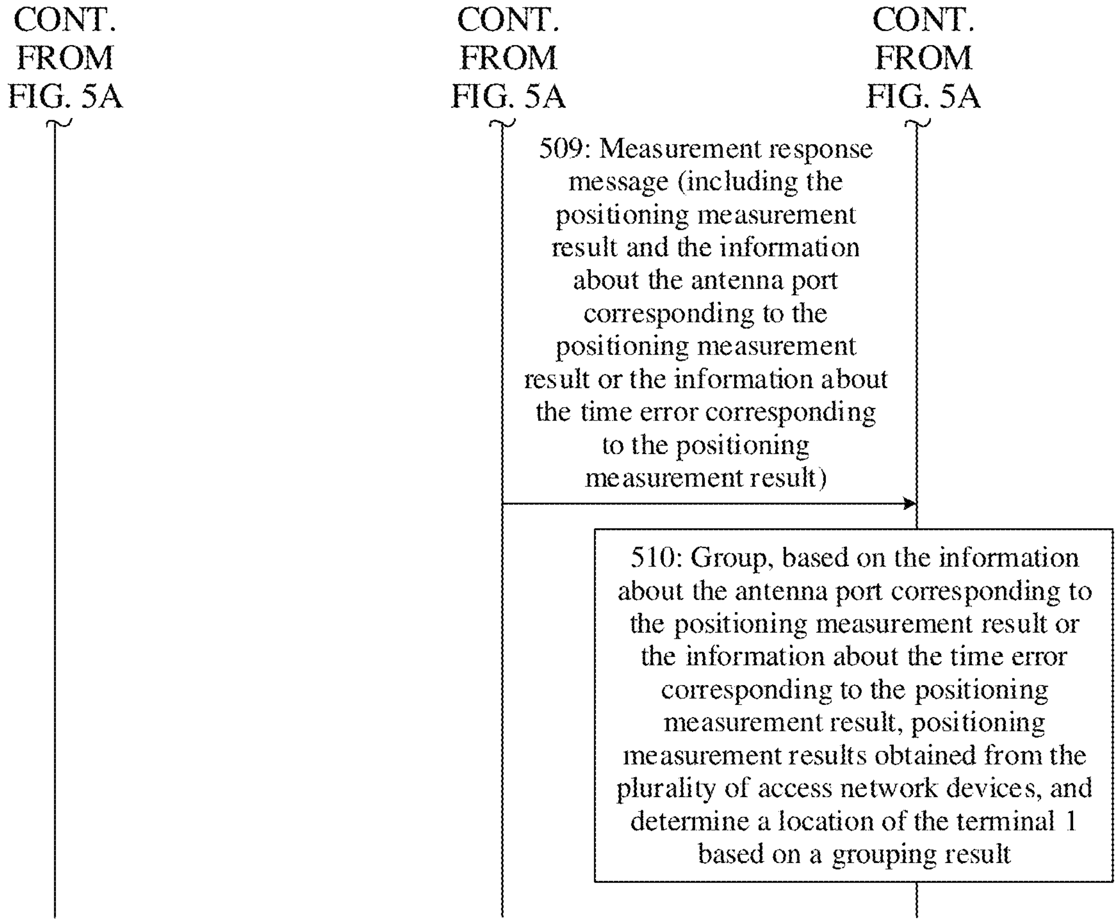

Refer to FIG. 5A and FIG. 5B. The method includes the following steps.

501: The LMF receives a positioning request message, where the positioning request message is used to request to position a terminal 1.

502: The LMF sends a positioning information request message to a serving access network device of the terminal 1, where the positioning information request message requests configuration information of a positioning reference signal. Correspondingly, the serving access network device receives the positioning information request message from the LMF.

Optionally, the positioning information request message further requests a correspondence between information about an antenna port and information about a time error of the terminal 1. For example, the positioning information request message may include third indication information. The third indication information indicates the correspondence between the information about the antenna port and the information about the time error of the terminal 1. The positioning information request message requests the correspondence between the information about the antenna port and the information about the time error of the terminal 1 by using the third indication information.

For example, the positioning information request message may be an NR positioning protocol a (NRPPa) positioning information request (NRPPa Positioning Information Request) message.

503: The serving access network device sends a configuration message to the terminal 1, where the configuration message includes configuration information of a time-frequency resource (for example, an SRS resource) of the positioning reference signal and configuration information of an antenna port of the positioning reference signal. Correspondingly, the terminal 1 receives the configuration message from the serving access network device.

Optionally, the configuration message further includes second indication information. The second indication information indicates the terminal 1 to report the correspondence between the information about the antenna port and the information about the time error.

For example, the configuration message may be an RRC reconfiguration message.

504: The terminal 1 sends a configuration complete message to the serving access network device.

Optionally, the configuration complete message includes a first correspondence, and the first correspondence includes a correspondence between information about a plurality of antenna ports and information about a plurality of time errors. It should be noted that even if the configuration message does not include the second indication information, the configuration complete message may include the first correspondence.

For example, the configuration complete message may be an RRC reconfiguration complete message.

It should be noted that the first correspondence may also be carried in capability information of the terminal. In this case, the configuration message in step 503 may not include the second indication information, and the configuration complete message in step 504 may not include the first correspondence.

505: The serving access network device sends a positioning information response message to the LMF, where the positioning information response message includes the configuration information of the time-frequency resource of the positioning reference signal of the terminal 1 and the configuration information of the antenna port of the positioning reference signal of the terminal 1, and the positioning information response message further includes the first correspondence. Correspondingly, the LMF receives the positioning information response message from the serving access network device.

It should be noted that even if the positioning information request message does not include the third indication information, the positioning information response message may include the first correspondence.

In a subsequent process, the LMF may send the configuration information of the time-frequency resource of the positioning reference signal of the terminal 1 and the configuration information of the antenna port of the positioning reference signal of the terminal 1 to a plurality of access network devices, so that the plurality of access network devices obtain a positioning measurement result based on the positioning reference signal sent by the terminal 1. The plurality of access network devices are access network devices that participate in positioning of the terminal 1. It should be noted that, if the plurality of access network devices include the serving access network device, the LMF does not need to send the configuration information of the time-frequency resource of the positioning reference signal and the configuration information of the antenna port of the positioning reference signal to the serving access network device.

If the plurality of access network devices subsequently report the positioning measurement result and the information about the time error corresponding to the positioning measurement result, the LMF may further send the first correspondence to the plurality of access network devices, so that the plurality of access network devices determine, based on the first correspondence, the information about the time error corresponding to the positioning measurement result. It should be noted that, if the plurality of access network devices include the serving access network device, the LMF does not need to send the first correspondence to the serving access network device.

For example, the positioning information response message may be an NRPPa positioning information response message.

506: The LMF sends a measurement request message to the plurality of access network devices, where the measurement request message requests to report the positioning measurement result and the information about the antenna port corresponding to the positioning measurement result or the information about the time error corresponding to the positioning measurement result. Correspondingly, the plurality of access network devices receive the measurement request message from the LMF.

The measurement request message may include first indication information, where the first indication information indicates to report the information about the antenna port corresponding to the positioning measurement result, or the first indication information indicates to report the information about the time error corresponding to the positioning measurement result. The measurement request message requests, by using the first indication information, the information about the antenna port corresponding to the positioning measurement result or the information about the time error corresponding to the positioning measurement result.

For example, the measurement request message may be an NRPPa measurement request message.

507: The terminal 1 sends the positioning reference signal based on the configuration information of the time-frequency resource of the positioning reference signal and the configuration information of the antenna port of the positioning reference signal. Correspondingly, the plurality of access network devices receive the positioning reference signal from the terminal 1 based on the configuration information of the time-frequency resource of the positioning reference signal of the terminal 1 and the configuration information of the antenna port of the positioning reference signal of the terminal 1.

508: The plurality of access network devices obtain the positioning measurement result based on the received positioning reference signal, and determine the information about the antenna port corresponding to the positioning measurement result or the information about the time error corresponding to the positioning measurement result.

509: The plurality of access network devices send measurement response messages to the LMF. The measurement response message includes the positioning measurement result and the information about the antenna port corresponding to the positioning measurement result or the information about the time error corresponding to the positioning measurement result. Correspondingly, the LMF receives the measurement response messages from the plurality of access network devices.

For example, the measurement response message may be an NRPPa measurement response message.

Optionally, the plurality of access network devices further send the second positioning measurement information to the LMF.

510: The LMF groups, based on the information about the antenna port corresponding to the positioning measurement result or the information about the time error corresponding to the positioning measurement result, positioning measurement results obtained from the plurality of access network devices, and determines a location of the terminal 1 based on a grouping result.

If the plurality of access network devices further send the second positioning measurement information to the LMF, before step 510, the LMF may further calibrate, based on the second positioning measurement information, the positioning measurement results obtained from the plurality of access network devices.

It may be understood that, in step 510, if the LMF does not need to calibrate, based on the information about the time error corresponding to the positioning measurement result, the positioning measurement results obtained from the plurality of access network devices, and does not need to determine, based on the first correspondence, the information about the time error corresponding to the positioning measurement result (in this case, the access network device reports the positioning measurement result and the information about the antenna port corresponding to the positioning measurement result), the LMF does not need to obtain the first correspondence. In this case, step 502 may not include the third indication information, and step 505 may not include the first correspondence.

It should be noted that, in the embodiment shown in FIG. 5A and FIG. 5B, the access network device may alternatively send the positioning measurement result, the information about the antenna port corresponding to the positioning measurement result, and the information about the time error corresponding to the positioning measurement result to the LMF. The LMF may determine, independently or based on a configuration, whether the information about the antenna port or the information about the time error is used to group the positioning measurement results.

Figure 6A:
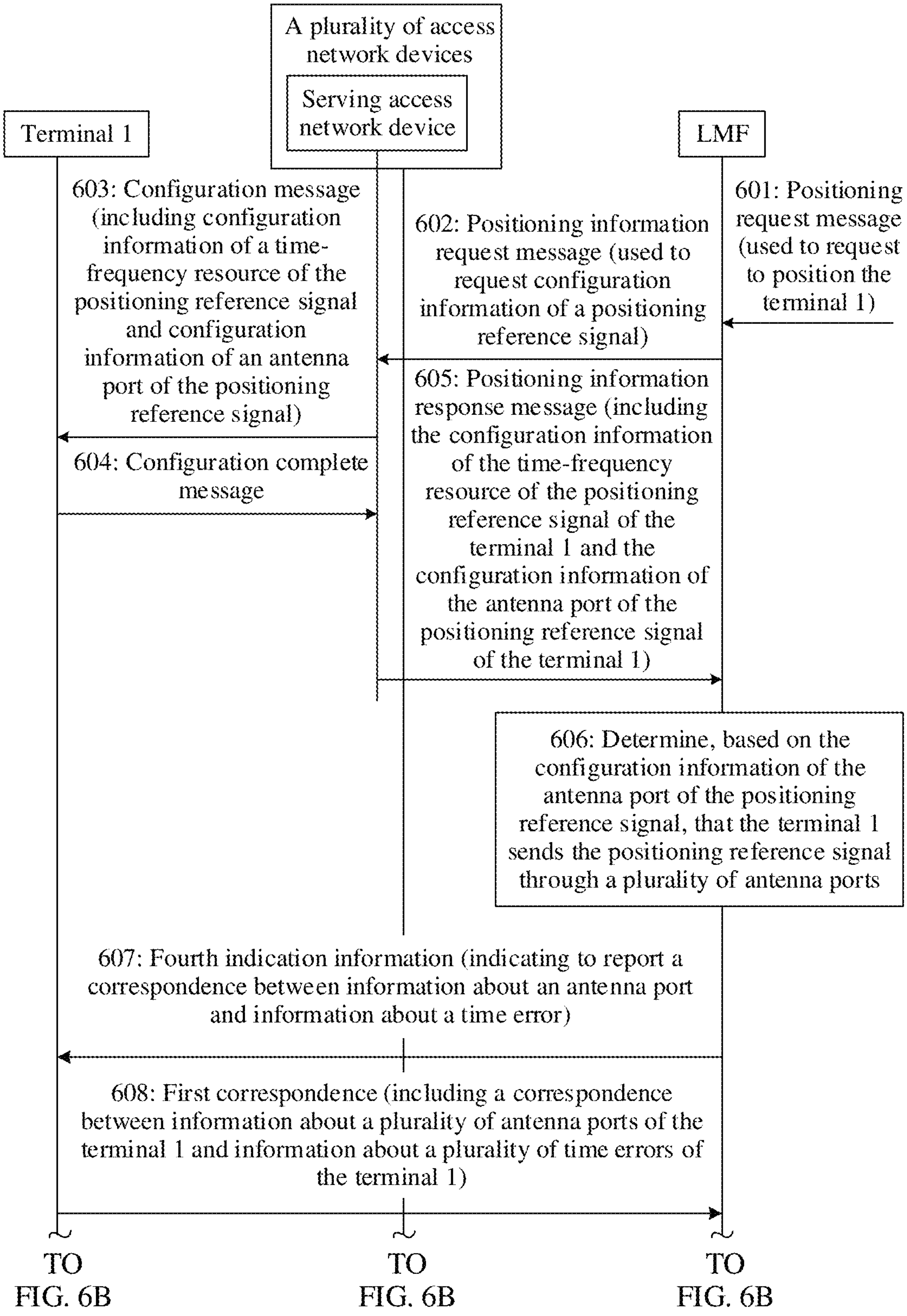
FIG. 6A and FIG. 6B are example flowcharts of still another positioning method according to an embodiment of this application.
Figure 6B:
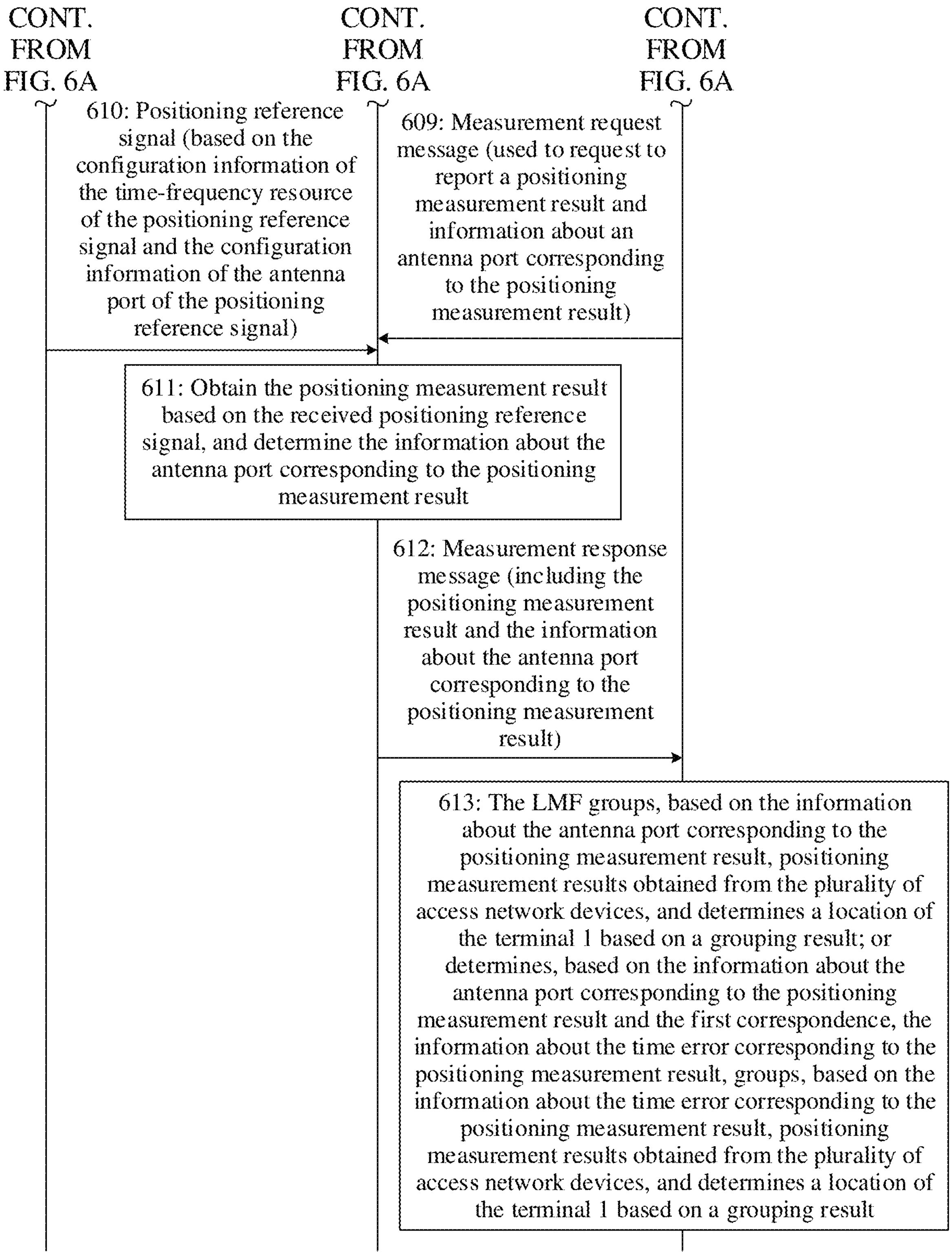

Refer to FIG. 6A and FIG. 6B. The method includes the following steps.

601: The LMF receives a positioning request message, where the positioning request message is used to request to position a terminal 1.

602: The LMF sends a positioning information request message to a serving access network device of the terminal 1, where the positioning information request message requests configuration information of a positioning reference signal. Correspondingly, the serving access network device receives the positioning information request message from the LMF.

For example, the positioning information request message may be an NRPPa positioning information request message.

603: The serving access network device sends a configuration message to the terminal 1, where the configuration message includes configuration information of a time-frequency resource (for example, an SRS resource) of the positioning reference signal and configuration information of an antenna port of the positioning reference signal. Correspondingly, the terminal 1 receives the configuration message from the serving access network device.

For example, the configuration message may be an RRC reconfiguration message.

604: The terminal 1 sends a configuration complete message to the serving access network device.

For example, the configuration complete message may be an RRC reconfiguration complete message.

605: The serving access network device sends a positioning information response message to the LMF, where the positioning information response message includes the configuration information of the time-frequency resource of the positioning reference signal of the terminal and the configuration information of the antenna port of the positioning reference signal of the terminal 1.

In a subsequent process, the LMF may send the configuration information of the time-frequency resource of the positioning reference signal of the terminal 1 and the configuration information of the antenna port of the positioning reference signal of the terminal 1 to a plurality of access network devices, so that the plurality of access network devices obtain a positioning measurement result based on the positioning reference signal sent by the terminal 1. The plurality of access network devices are access network devices that participate in positioning of the terminal 1. It should be noted that, if the plurality of access network devices include the serving access network device, the LMF does not need to send the configuration information of the time-frequency resource of the positioning reference signal and the configuration information of the antenna port of the positioning reference signal to the serving access network device.

For example, the positioning information response message may be an NRPPa positioning information response message.

606: The LMF determines, based on the configuration information of the antenna port of the positioning reference signal, that the terminal 1 sends the positioning reference signal through a plurality of antenna ports.

Specifically, if the configuration information of the antenna port of the positioning reference signal is a port quantity of the antenna port, and the port quantity is greater than 1, the LMF determines that the terminal 1 sends the positioning reference signal through a plurality of antenna ports. If the configuration information of the antenna port of the positioning reference signal is a port number of the antenna port, and a quantity of port numbers is greater than 1, the LMF determines that the terminal 1 sends the positioning reference signal through a plurality of antenna ports.

607: The LMF sends fourth indication information to the terminal 1, where the fourth indication information indicates to report a correspondence between information about an antenna port and information about a time error of the terminal. Correspondingly, the terminal 1 receives the fourth indication information from the LMF.

It should be noted that, if the terminal 1 sends the positioning reference signal through a single antenna port, a problem that positioning precision of the terminal is reduced due to different information about time errors corresponding to different antenna ports does not exist. Therefore, the terminal 1 does not need to report the correspondence between the information about the antenna port and the information about the time error to the LMF. When the terminal sends the positioning reference signal through a plurality of antenna ports, a problem that positioning precision of the terminal is reduced due to different information about time errors corresponding to different antenna ports exists. In this case, the terminal 1 needs to report the correspondence between the information about the antenna port and the information about the time error to the LMF. Therefore, the LMF may send the fourth indication information to the terminal 1 when determining that the terminal 1 sends the positioning reference signal through the plurality of antenna ports.

608: The terminal 1 sends a first correspondence to the LMF based on the fourth indication information, where the first correspondence includes a correspondence between information about a plurality of antenna ports and information about a plurality of time errors of the terminal 1.

The terminal may send the first correspondence to the location management function network element through an LPP layer between the terminal and the location management function network element.

609: The LMF sends a measurement request message to the plurality of access network devices, where the measurement request message requests to report a positioning measurement result and information about an antenna port corresponding to the positioning measurement result. Correspondingly, the plurality of access network devices receive the measurement request message from the LMF.

The measurement request message may include first indication information, where the first indication information indicates to report the information about the antenna port corresponding to the positioning measurement result. The measurement request message requests, by using the first indication information, the information about the antenna port corresponding to the positioning measurement result.

For example, the measurement request message may be an NRPPa measurement request message.

610: The terminal 1 sends the positioning reference signal based on the configuration information of the time-frequency resource of the positioning reference signal and the configuration information of the antenna port of the positioning reference signal. Correspondingly, the plurality of access network devices receive the positioning reference signal from the terminal 1 based on the configuration information of the time-frequency resource of the positioning reference signal of the terminal 1 and the configuration information of the antenna port of the positioning reference signal of the terminal 1.

611: The plurality of access network devices obtain the positioning measurement result based on the received positioning reference signal, and determine the information about the antenna port corresponding to the positioning measurement result.

612: The plurality of access network devices send measurement response messages to the LMF. The measurement response message includes the positioning measurement result and the information about the antenna port corresponding to the positioning measurement result. Correspondingly, the LMF receives the measurement response messages from the plurality of access network devices.

For example, the measurement response message may be an NRPPa measurement response message.

Optionally, the plurality of access network devices further send the second positioning measurement information to the LMF.

613: The LMF groups, based on the information about the antenna port corresponding to the positioning measurement result, positioning measurement results obtained from the plurality of access network devices, and determines a location of the terminal 1 based on a grouping result. Alternatively, the LMF determines, based on the information about the antenna port corresponding to the positioning measurement result and the first correspondence, the information about the time error corresponding to the positioning measurement result, groups, based on the information about the time error corresponding to the positioning measurement result, positioning measurement results obtained from the plurality of access network devices, and determines a location of terminal 1 based on a grouping result.

If the plurality of access network devices further send the second positioning measurement information to the LMF, before step 613, the LMF may further calibrate, based on the second positioning measurement information, the positioning measurement results obtained from the plurality of access network devices.

It may be understood that, in step 613, if the LMF groups, based on the information about the antenna port corresponding to the positioning measurement result, the positioning measurement results obtained from the plurality of access network devices, but does not group, based on the information about the time error corresponding to the positioning measurement result, the positioning measurement results obtained from the plurality of access network devices, the LMF does not need to receive the first correspondence from the terminal 1. In this case, step 607 and step 608 may not be performed.

For specific implementations of the steps in the embodiments shown in FIG. 5A and FIG. and FIG. 6A and FIG. 6B, refer to related descriptions based on the embodiment shown in FIG. 4. In both FIG. 5A and FIG. 5B and FIG. 6A and FIG. 6B, an example in which a plurality of access network devices include a serving access network device is used for drawing.

It should be noted that an execution sequence between the steps in the foregoing embodiments of this application is merely an example. In actual implementation, there may be another execution sequence. In addition, there may be another existing step between two steps. This is not limited in this application.

The system architecture and application scenarios described in embodiments of this application are intended to describe the technical solution in embodiments of this application more clearly, and do not constitute a limitation on the technical solutions provided in embodiments of this application. A person of ordinary skill in the art may learn that the technical solutions provided in embodiments of this application are also applicable to a similar technical problem as a network architecture evolves and a new service scenario emerges.

The foregoing mainly describes the solutions of embodiments of this application from a perspective of a method. It may be understood that, to implement the foregoing functions, each network element, for example, a location management function network element, an access network device, or a terminal, includes at least one of a corresponding hardware structure or a corresponding software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and implementation constraints of the technical solutions. A person skilled in the art may use different methods to implement the described functions for each particular application, but it should not be considered that the implementation goes beyond the scope of this application.

In embodiments of this application, the location management function network element, the access network device, or the terminal may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that, in embodiments of this application, division into the units is an example, and is merely a logical function division. In actual implementation, another division manner may be used.

Figure 7:
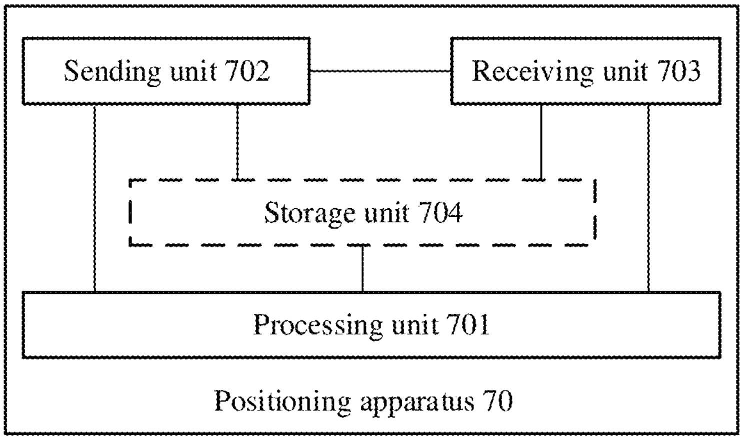
FIG. 7 is an example schematic diagram of composition of a positioning apparatus according to an embodiment of this application.

For example, FIG. 7 is a possible schematic diagram of a structure of a positioning apparatus (denoted as a positioning apparatus 70) in the foregoing embodiment. The positioning apparatus 70 includes a processing unit 701, a sending unit 702, and a receiving unit 703. Optionally, the positioning apparatus further includes a storage unit 704. The positioning apparatus 70 may be configured to illustrate structures of the location management function network element, the access network device, and the terminal in the foregoing embodiments.

When the schematic diagram of the structure shown in FIG. 7 is used to show a structure of the location management function network element in the foregoing embodiments, the processing unit 701 is configured to perform 403 in FIGS. 4 and 510 in FIG. 5A and FIG. 5B (in this case, the location management function network element is the LMF), and 606 and 613 in FIG. 6A and FIG. 6B (in this case, the location management function network element is the LMF). The processing unit 701 is further configured to obtain information that the sending unit 702 needs to send, for example, the positioning information request message, the measurement request message, and the fourth indication information in FIG. 4, FIG. 5A and FIG. 5B, and FIG. 6A and FIG. 6B, and the sending unit 702 sends the information to another network element or device. The receiving unit 703 is configured to receive information from the another network element or device, for example, the positioning measurement information, the positioning information response message, the measurement response message, or the first correspondence, and deliver the information to the processing unit 701 for processing. The storage unit 704 is configured to store program code and data of the location management function network element. Each unit in the location management function network element is further configured to perform an action performed by the location management function network element in another process described in embodiments of this application.

When the schematic diagram of the structure shown in FIG. 7 is used to show a structure of the access network device in the foregoing embodiments, the processing unit 701 is configured to perform 508 in FIG. 5A and FIG. 5B and 611 in FIG. 6A and FIG. 6B. The processing unit 701 is further configured to obtain information that the sending unit 702 needs to send, for example, the positioning measurement information, the configuration message (in this case, the access network device is the serving access network device), the positioning information response message (in this case, the access network device is the serving access network device), and the positioning response message in FIG. 4, FIG. 5A and FIG. 5B, and FIG. 6A and FIG. 6B. The sending unit 702 sends the information to another network element or device. The receiving unit 703 is configured to receive information from the another network element or device, for example, the positioning reference signal, the positioning information request message, the configuration complete message, or the measurement request message, and deliver the information to the processing unit 701 for processing. The storage unit 704 is configured to store program code and data of the access network device. Each unit in the access network device is further configured to perform an action performed by the access network device in another process described in embodiments of this application.

When the schematic diagram of the structure shown in FIG. 7 is used to show a structure of the terminal in the foregoing embodiments, the processing unit 701 is configured to obtain information that the sending unit 702 needs to send, for example, the positioning reference signal, the configuration complete message, and the first correspondence in FIG. 4, FIG. 5A and FIG. 5B, and FIG. 6A and FIG. 6B. The sending unit 702 sends the information to another network element or device. The receiving unit 703 is configured to receive information, for example, the configuration message or the fourth indication information, from the another network element or device, and deliver the information to the processing unit 701 for processing. The storage unit 704 is configured to store program code and data of the terminal. Each unit in the terminal is further configured to perform an action performed by the terminal in another process described in embodiments of this application.

For example, the positioning apparatus 70 may be a device, or may be a chip or a chip system.

When the positioning apparatus 70 is a device, the processing unit 701 may be a processor. The sending unit 702 may be a communication interface, a transmitter, or an output interface. The receiving unit 703 may be a communication interface, a receiver, or an input interface. Optionally, the transmitter and the receiver may form a transceiver. Optionally, the input interface may be an input circuit, and the output interface may be an output circuit.

When the positioning apparatus 70 is a chip or a chip system, the sending unit 702 may be a communication interface, an output interface, an interface circuit, an output circuit, a pin, a related circuit, or the like on the chip or the chip system. The receiving unit 703 may be a communication interface, an input interface, an interface circuit, an input circuit, a pin, a related circuit, or the like on the chip or the chip system. The processing unit 701 may be a processor, a processing circuit, a logic circuit, or the like.

The sending unit 702 and the receiving unit 703 may also be collectively referred to as a communication unit or a transceiver unit.

When the integrated unit in FIG. 7 is implemented in a form of a software function module and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods described in embodiments of this application. The storage medium that stores the computer software product includes any medium that can store program code, such as a USB flash drive, a removable hard disk, a read-only memory (ROM), a random access memory (RAM), a magnetic disk, or an optical disc.

Figure 8:
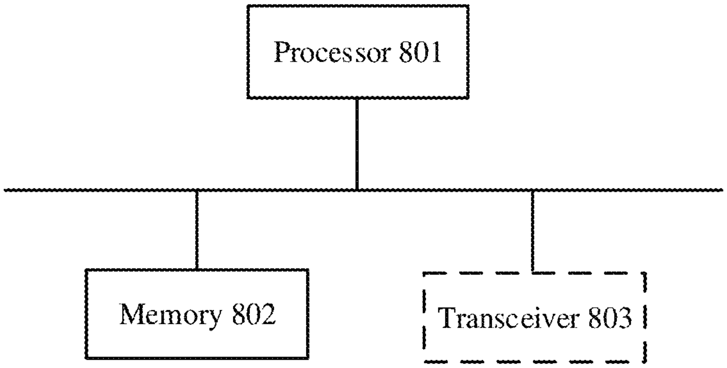
FIG. 8 is an example schematic diagram of a hardware structure of a positioning apparatus according to an embodiment of this application.
Figure 9:
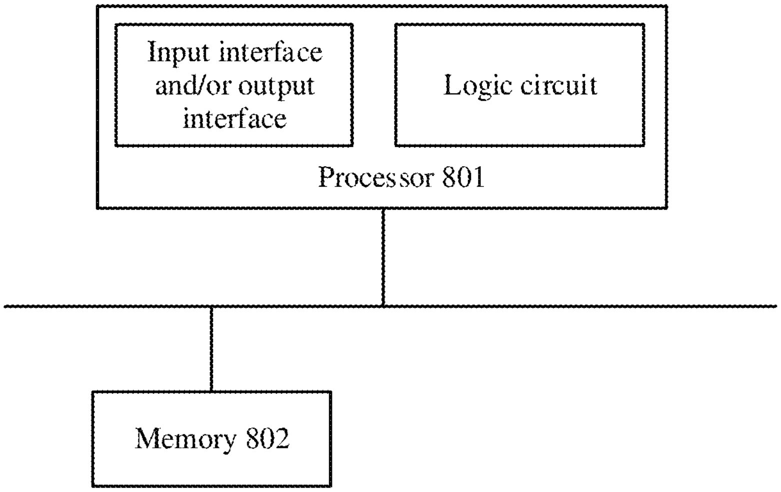
FIG. 9 is an example schematic diagram of a hardware structure of another positioning apparatus according to an embodiment of this application.

An embodiment of this application further provides a schematic diagram of a hardware structure of a positioning apparatus. Refer to FIG. 8 or FIG. 9. The positioning apparatus includes a processor 801, and optionally, further includes a memory 802 connected to the processor 801.

The processor 801 may be a general-purpose central processing unit (CPU), a microprocessor, an application-specific integrated circuit (ASIC), or one or more integrated circuits configured to control program execution of the solutions of this application. The processor 801 may alternatively include a plurality of CPUs, and the processor 801 may be a single-core (e.g., single-CPU) processor or a multi-core (e.g., multi-CPU) processor. The processor herein may be one or more devices, circuits, or processing cores configured to process data (for example, computer program instructions).

The memory 802 may be a ROM or another type of static storage device that can store static information and instructions, or a RAM or another type of dynamic storage device that can store information and instructions, or may be an electrically erasable programmable read-only memory (EEPROM), a compact disc read-only memory (CD-ROM) or another compact disc storage, an optical disc storage (which includes a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. This is not limited in embodiments of this application. The memory 802 may exist independently (in this case, the memory 802 may be located outside the positioning apparatus, or may be located inside the positioning apparatus), or may also be integrated with the processor 801. The memory 802 may include computer program code. The processor 801 is configured to execute the computer program code stored in the memory 802, to implement the method provided in the embodiments of this application.

In a first possible implementation, as shown in FIG. 8, the positioning apparatus further includes a transceiver 803. The processor 801, the memory 802, and the transceiver 803 are connected through a bus. The transceiver 803 is configured to communicate with another device or a communication network. Optionally, the transceiver 803 may include a transmitter and a receiver. A component configured to implement a receiving function in the transceiver 803 may be considered as a receiver. The receiver is configured to perform the receiving step in embodiments of this application. A component configured to implement a sending function in the transceiver 803 may be considered as a transmitter. The transmitter is configured to perform the sending step in embodiments of this application. For example, the processor 801 may perform an action of the processing unit 701, the transmitter in the transceiver 803 may perform an action of the sending unit 702, and the receiver in the transceiver 803 may perform an action of the receiving unit 703. For details, refer to the foregoing related descriptions.

In a second possible implementation, the processor 801 includes a logic circuit and an input interface and/or an output interface. For example, the output interface is configured to perform a sending action in a corresponding method, and the input interface is configured to perform a receiving action in the corresponding method. For example, the processor 801 may perform an action of the processing unit 701, the output interface may perform an action of the sending unit 702, and the input interface may perform an action of the receiving unit 703. For details, refer to the foregoing related descriptions.

In an implementation process, the steps in the method provided in this embodiment may be completed by using a hardware integrated logic circuit in the processor, or by using instructions in a form of software. Steps of the methods disclosed with reference to embodiments of this application may be directly executed and accomplished by a hardware processor, or may be executed and accomplished by using a combination of hardware and software modules in the processor.

An embodiment of this application further provides a computer-readable storage medium, including computer-executable instructions. When the computer-executable instructions are run on a computer, the computer is enabled to perform any one of the foregoing methods.

An embodiment of this application further provides a computer program product, including computer-executable instructions. When the computer-executable instructions are run on a computer, the computer is enabled to perform any one of the foregoing methods.

An embodiment of this application further provides a communication system, including any one or more of the foregoing location management function network element, the plurality of access network devices, and the terminal.

An embodiment of this application further provides a positioning apparatus, including a processor and an interface. The processor is coupled to a memory through the interface. When the processor executes a computer program or computer-executable instructions in the memory, any method provided in the foregoing embodiments is performed.

All or some of the foregoing embodiments may be implemented by using software, hardware, firmware, or any combination thereof. When a software program is used to implement the embodiments, the embodiments may be implemented entirely or partially in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and appended claims. In the claims, the word "comprise" (e.g., comprising) does not exclude another component or step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the scope of this application. Correspondingly, the specification and accompanying drawings are merely example descriptions of this application defined by the appended claims, and are considered as any of or all modifications, variations, combinations, or equivalents that cover the scope of this application. It is clear that, a person skilled in the art can make various modifications and variations to this application without departing from the protection scope of this application. This application is intended to cover these modifications and variations of this application provided that they fall within the scope of protection defined by the claims of this application and their equivalent technologies.

What is claimed is:

1. A positioning method, comprising:

receiving, by an access network device, a positioning reference signal from a terminal;

receiving, by the access network device, a first correspondence from the terminal, wherein the first correspondence includes a correspondence between information about a plurality of antenna ports and information about a plurality of time errors, and each antenna port, of the plurality of antenna ports, is configured to send a corresponding positioning reference signal; and sending, by the access network device, positioning measurement information to a location management function network element, wherein the positioning measurement information includes a positioning measurement result determined based on the positioning reference signal and information about an antenna port corresponding to the positioning measurement result, and the antenna port is of the positioning reference signal on which the positioning measurement result is based, or the positioning measurement information includes a positioning measurement result determined based on the positioning reference signal and information about a time error corresponding to the positioning measurement result, and the time error corresponds to an antenna port of the positioning reference signal on which the positioning measurement result is based.

2. The method according to claim 1, further comprising:

receiving, by the access network device, first indication information from the location management function network element, wherein the first indication information indicates to report the information about the antenna port corresponding to the positioning measurement result, or the first indication information indicates to report the information about the time error corresponding to the positioning measurement result; and sending, by the access network device, the positioning measurement information to the location management function network element comprises:

sending, by the access network device, the positioning measurement information to the location management function network element based on the first indication information.

3. The method according to claim 1, wherein the access network device is a serving access network device of the terminal.

4. The method according to claim 3, further comprising:

sending, by the access network device, second indication information to the terminal, wherein the second indication information indicates the terminal to report the correspondence between the information about the antenna port and the information about the time error.

5. The method according to claim 3, wherein when the positioning measurement information includes the positioning measurement result determined based on the positioning reference signal and the information about the time error corresponding to the positioning measurement result, the method further comprises:

determining, by the access network device, the positioning measurement result based on the positioning reference signal; and determining, by the access network device and based on the information about the antenna port corresponding to the positioning measurement result and the first correspondence, the information about the time error corresponding to the positioning measurement result.

6. The method according to claim 3, further comprising:

sending, by the access network device, the first correspondence to the location management function network element.

7. A positioning method, comprising:

receiving, by the location management function network element, a first correspondence from a serving access network device of the terminal, or receiving the first correspondence from the terminal, wherein the first correspondence includes a correspondence between information about a plurality of antenna ports and information about a plurality of time errors, and each antenna port, of the plurality of antenna ports, is configured to send a corresponding positioning reference signal; and receiving, by a location management function network element, positioning measurement information from a plurality of access network devices, wherein the positioning measurement information includes a positioning measurement result determined based on a positioning reference signal of a terminal and information about an antenna port corresponding to the positioning measurement result, and the antenna port is of the positioning reference signal on which the positioning measurement result is based, or the positioning measurement information includes a positioning measurement result determined based on a positioning reference signal of a terminal and information about a time error corresponding to the positioning measurement result, and the time error corresponds to an antenna port of the positioning reference signal on which the positioning measurement result is based; and determining, by the location management function network element, a location of the terminal based on the positioning measurement information of the plurality of access network devices.

8. The method according to claim 7, further comprising: sending, by the location management function network element, first indication information to the plurality of access network devices, wherein the first indication information indicates to report the information about the antenna port corresponding to the positioning measurement result, or the first indication information indicates to report the information about the time error corresponding to the positioning measurement result.

9. The method according to claim 7, wherein determining, by the location management function network element, the location of the terminal based on the positioning measurement information of the plurality of access network devices comprises:

grouping, by the location management function network element, positioning measurement results in the positioning measurement information of the plurality of access network devices based on the information about the antenna port or based on the information about the time error in the positioning measurement information of the plurality of access network devices; and determining, by the location management function network element, the location of the terminal based on a grouping result.

10. The method according to claim 7, further comprising: sending, by the location management function network element, fourth indication information to the terminal, wherein the fourth indication information indicates to report the correspondence between the information about the antenna port and the information about the time error of the terminal.

11. A positioning method, comprising:

sending, by a terminal, a first correspondence to a serving access network device or sending the first correspondence to a location management function network element, wherein the first correspondence includes a correspondence between information about a plurality of antenna ports and information about a plurality of time errors, each antenna port, of the plurality of antenna ports, is configured to send a corresponding positioning reference signal, and the first correspondence is used to determine a location of the terminal; and sending, by the terminal, the corresponding positioning reference signal through one or more of the plurality of antenna ports.

12. The method according to claim 11, further comprising:

receiving, by the terminal, configuration information from the serving access network device, wherein the configuration information includes configuration information of a time-frequency resource of the positioning reference signal and configuration information of an antenna port of the positioning reference signal; and sending, by the terminal, the corresponding positioning reference signal through one or more of the plurality of antenna ports comprises:

sending, by the terminal, the corresponding positioning reference signal through the one or more of the plurality of antenna ports based on the configuration information.

13. The method according to claim 11, further comprising:

receiving, by the terminal, second indication information from the serving access network device or fourth indication information from the location management function network element, wherein the second indication information and the fourth indication information indicate the terminal to report the correspondence between the information about the antenna port and the information about the time error; and sending, by the terminal, the first correspondence to the serving access network device or the location management function network element comprises:

sending, by the terminal, the first correspondence to the serving access network device or the location management function network element based on the second indication information or the fourth indication information.

14. The method according to claim 11, wherein in association with positioning measurement information including a positioning measurement result determined based on the positioning reference signal and information about a time error corresponding to the positioning measurement result:

the positioning measurement result is determined based on the positioning reference signal, and the information about the time error corresponding to the positioning measurement result is determined based on information about an antenna port corresponding to the positioning measurement result and the first correspondence.

15. A system, comprising:

a processor; and a memory configured to store computer readable instructions that, when executed by the processor, cause the system to implement the method of claim 1.

16. A system, comprising:

a processor; and a memory configured to store computer readable instructions that, when executed by the processor, cause the system to implement the method of claim 7.

17. A system, comprising:

a processor; and a memory configured to store computer readable instructions that, when executed by the processor, cause the system to implement the method of claim 11.

18. A non-transitory computer readable storage medium configured to store computer readable instructions that, when executed by the access network device, cause the access network device to implement the method of claim 1.

19. A non-transitory computer readable storage medium configured to store computer readable instructions that, when executed by the location management function network element, cause the location management function network element to implement the method of claim 7.

20. A non-transitory computer readable storage medium configured to store computer readable instructions that, when executed by the terminal, cause the terminal to implement the method of claim 11.

* * * * *